(12) United States Patent
Miyazawa et al.

(10) Patent No.: US 6,252,829 B1
(45) Date of Patent: Jun. 26, 2001

(54) ELECTRONIC WATCH

(75) Inventors: Eiichi Miyazawa; Satoshi Chiba, both of Suwa; Tsuyoshi Matsui, Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/090,986

(22) Filed: Jun. 5, 1998

(30) Foreign Application Priority Data

| Jun. 9, 1997 | (JP) | 9-150954 |
| Jun. 9, 1997 | (JP) | 9-150955 |
| Nov. 4, 1997 | (JP) | 9-302252 |
| May 19, 1998 | (JP) | 10-137012 |

(51) Int. Cl.$^7$ ............ G04C 17/00; G02F 1/1335
(52) U.S. Cl. ............ 368/242; 349/14; 349/69; 349/97; 349/108
(58) Field of Search ............ 368/82–84, 239–242; 349/61, 64, 68, 69, 80, 96, 97, 106–108

(56) References Cited

U.S. PATENT DOCUMENTS

| 4,975,694 | 12/1990 | McLaughlin et al. | 340/825.47 |
| 5,686,979 | * 11/1997 | Weber et al. | 349/96 |

FOREIGN PATENT DOCUMENTS

| 2-172-733 | 9/1986 | (GB) . |
| 55-146091 | 11/1980 | (JP) . |
| WO 90/04806 | 5/1990 | (WO) . |
| WO 97/01788 | 1/1997 | (WO) . |

OTHER PUBLICATIONS

M.F. Weber, "Retroreflecting Sheet Polarizer," SID 92 Digest, pp. 427–429.

* cited by examiner

*Primary Examiner*—Vit Miska
(74) *Attorney, Agent, or Firm*—Oliff & Berridge PLC

(57) ABSTRACT

An electronic watch diversifies the mode of display for numeric information and the like to presents the information using the natural ambient light or a back light. The electronic watch may includes a polarizer for transmitting a linearly polarized light polarized in one direction while absorbing the remaining polarized light, a liquid crystal element that selects a state in which the polarization of a polarized light ray is changed through transmission and a state in which the polarization of the polarized light is not changed, a polarization separating film, opposed to the polarizer with the liquid crystal element interposed therebetween, and a back light for emitting light to the liquid crystal element through the polarization separating film. The polarization separating film 12 transmits light polarized in one direction while reflecting light linearly polarized in a direction perpendicular to the one direction. When the emission of the light emitting device is used to present the numeric information and the like, the information is presented by the emission of the back light.

22 Claims, 16 Drawing Sheets

ELECTRONIC WATCH

BACKGROUND OF THE INVENTION

1. Field of Invention

The present invention relates to an electronic watch such as a wristwatch, a stopwatch and the like, for counting and presenting time.

2. Description of Related Art

Electronic watches that employ a flat display such as a liquid crystal display to present numeric information and the like thereon are well known. For example, an electronic watch employing a liquid crystal display comprises a pair of polarizers 52 and 53 with a liquid crystal element 51 interposed therebetween, and a light emitting element 54 arranged on the underside of the polarizer 53 as shown in FIG. 21. The pair of polarizers 52 and 53 are arranged such that their polarization axes are mutually perpendicular.

In such a conventional electronic watch, the ambient light is used to present numeric information and the like when there is light (daytime) and the light emitting element 54 emits light as necessary to present numeric information and the like when there is not light (nighttime). To present numeric information, a predetermined ON voltage is applied between electrodes of the liquid crystal element 51, and an area where no voltage is applied or where an OFF voltage is applied is a background of white or any other appropriate color. As shown, the area where the ON voltage is applied to present information is represented by "ON" and the area where no voltage or the OFF voltage is applied is represented by "OFF."

When the ambient light is used to present the background (namely with the liquid crystal element 51 at an OFF state), light linearly polarized in a direction parallel to the page of FIG. 21, out of the ambient light, namely the natural light, is transmitted through the polarizer 52 as represented by an arrow P, and is twisted by 90° in polarization direction by the liquid crystal element 51 at an OFF state, thereby becoming light linearly polarized in a direction perpendicular to the page of FIG. 21. The linearly polarized light is then transmitted through the polarizer 53, and is scattered on the surface of the light emitting element 54, and part of the scattered light is transmitted through the polarizer 53, liquid crystal element 51 and polarizer 52 in that order, and is presented outside, and the background is thus recognized as a white background.

When the ambient light is used to present numeric information and the like (namely with the liquid crystal element 51 at an ON state), light linearly polarized in a direction parallel to the page of FIG. 21, out of the ambient light, is picked out by the polarizer 52, and is transmitted through the liquid crystal element 51 as represented by an arrow Q. Since the liquid crystal element 51 is at an ON state, the linearly polarized light ray keeps its polarization direction parallel to the page of FIG. 21 without being twisted, and is thus absorbed by the polarizer 53. As a result, this area is externally recognized as "black."

In this way, numbers and the like in black, indicating time and other information, are presented on the white background when the ambient light is used for presentation.

On the other hand, when the emission of the light emitting element 54 is used to present the background (namely with the liquid crystal element 51 at an OFF state), as represented by an arrow C, light linearly polarized in a direction perpendicular to the page of FIG. 21, out of the emission of the light emitting element 54, namely the natural light, is picked out by the polarizer 53, and is twisted by 90° in polarization direction by the liquid crystal element 51 at an OFF state, thereby becoming light linearly polarized in a direction parallel to the page of FIG. 21, and is transmitted through the polarizer 52 to be recognized externally. The color of the light recognized is the emission color of the light emitting element 54, and is typically white.

When the emission of the light emitting element 54 is used to present numeric information and the like (namely with the liquid crystal element 51 at an ON state), as represented by an arrow D, light linearly polarized in a direction perpendicular to the page of FIG. 21, out of the emission of the light emitting element 54, is picked out by the polarizer 53, and is transmitted through the liquid crystal element 51 at an ON state and reaches the polarizer 52. Since the linearly polarized light then fails to coincide with the polarization direction of the polarizer 52, it is absorbed by the polarizer 52, and as a result, this area is externally recognized as "black."

In this way, to present information using the emission of the light emitting element 54, numbers and the like in black, indicating time and other information, are presented on the background of the emission color of the light emitting element 54.

As shown in FIG. 21, the light emitting element conventionally emits a monochromatic light in the watch of the type that presents information using the light emitted by the light emitting element disposed beneath the polarizer. The background color is thus monochromatic, for example, white only when the background color is presented by the emission color as represented by the arrow C in FIG. 21. Although the mode of display works in a simple presentation of the numeric information and the like, the mode of display may not be sufficient in the job of calling a viewer's attention.

FIG. 10 shows a major portion of an embodiment of a conventional electronic watch, particularly of a display element of the electronic watch. The electronic watch of this embodiment comprises the liquid crystal element 8, a first polarizer 11 arranged on one side of the liquid crystal element 8, a second polarizer 15 opposed to the first polarizer 11 with the liquid crystal element 8 interposed therebetween, and the back light 28.

The conventional watch includes the second polarizer 15, which is an ordinary polarizer like the first polarizer 11, and is arranged between the liquid crystal element 8 and the back light 28. This embodiment is also different from the embodiment shown in FIG. 21 in that the back light 28 of this embodiment emits lights of different colors in a plurality of areas while the conventional back light 54 emits a monochrome light from its entire surface.

The mode of display shown in FIG. 10, namely, the travel of the natural ambient light and of the emission of the back light 28, remains unchanged from that shown in FIG. 21. When the natural ambient light is used, the background is presented by irregularly reflected light from the back light 28 as represented by an arrow P, and the numeric information and the like are presented in black as represented by an arrow Q. When the emission of the back light 28 is used, the background is presented in the emission color of the back light 28 as represented by an arrow C, and the numeric information and the like are presented in "black" as represented by an arrow D.

In this watch, the back light 28 is provided with a plurality of emission areas S1, S2 and S3, and colors externally recognized may be emission colors of areas S1, S2 and S3 in the optical state represented by the arrow C. More specifically, the background colors with the back light 28 lit may be separately presented in yellowish green, red and orange or other colors may be used. The mode of display in which the background color on the display screen is switched between a white and another particular color such as yellowish green depending on whether the back light 28 is lit or extinguished is novel and appealing to the viewer.

As understood from the above discussion, numeric numbers and the like are simply presented in "black" in the conventional electronic watch both when the natural light is used and when the emission of the light emitting element is used, and the mode of display for numeric information and the like is simple.

SUMMARY OF THE INVENTION

The present invention has been developed in view of this problem, and it is a first object of the present invention to diversify the mode of display for numeric information and the like in a watch that selects between the natural light and a light emitting element.

It is a second object of the present invention to provide a novel mode of display that draws a viewer's attention by introducing a new idea in the coloration of an image on an electronic watch.

To achieve the above object, the electronic watch of the present invention for counting and presenting time may include (a) a first polarization separator which transmits therethrough light components linearly polarized in a first direction and which does not transmit light components linearly polarized in a second direction perpendicular to the first direction, (b) a polarization changing element, disposed at a position for receiving the linearly polarized light from the first polarization separator means that selects between a state in which a polarization axis is changed and a state in which the polarization axis is not changed, (c) a second polarization separator, diametrically opposed to the first polarization separator with the polarization changing element interposed therebetween, that transmits light linearly polarized in a second direction and that reflects light linearly polarized in a direction perpendicular to said second direction, and (d) a light emitting element that emits light to the polarization changing element through the second polarization separator.

In the above arrangement, the first polarization separator is constructed of an ordinary polarizer. The ordinary polarizer is a film member which outputs linearly polarized light polarized in one direction in response to an incident natural light, and may be produced by interposing a polarizer layer between protective layers of TAC (cellulose triacetate).

The polarization changing element may be constructed of a liquid crystal element, for example. Liquid crystals may be any of a variety of liquid crystals including a TN (Twisted Nematic) liquid crystal, an STN (Super-Twisted Nematic) liquid crystal, and an ECB (Electrically Controlled Birefringence) liquid crystal. The STN liquid crystals include ones employing color compensation optically anisotropic material, such as an F-STN (Film Compensated Super-Nematic) liquid crystal.

The second polarization separator may be one of (1) a polarization separating film of a multi-layered structure of films as disclosed in International Publication Nos. WO95/17692 and WO95/27919, (2) a polarization separator having a cholesteric liquid crystal with a $\lambda/4$ phase plate on one side or on both sides, (3) a polarization separator for separating a light into a reflected polarized light and a transmitted polarized light taking advantage of the Brewster's angle (SID 92 DIGEST, pages 427 to 429) or (4) a polarization separator employing a hologram.

The light emitting element may be (1) a flat light emitter such as an EL (Electroluminescence) element, (2) a light emitting device having a cold cathode tube, as a line light source, at the side edge of a light guide plate having a flat emission surface, or (3) a light emitting device having an array of LEDs (Light Emitting Diodes), dot light sources, at the side edge of a light guide plate having a flat emission surface.

The electronic watch may include the use of the second polarization separator, instead of a polarizer arranged between the polarization changing element and the light emitting element in the conventional electronic watch. The polarizer has generally the function of transmitting linearly polarized light polarized in one direction while not transmitting linearly polarized light polarized in a direction perpendicular to said one direction by absorption, and in contrast, the second polarization separator transmits linearly polarized light polarized in a second direction while reflecting linearly polarized light polarized in a direction perpendicular to said second direction, particularly, totally reflecting the linearly polarized light polarized in a direction perpendicular to the polarization axis of the linearly polarized light polarized in the one direction. When the second polarization separator is used in combination with a polarizer, the mode of display for presenting numeric information and the like is diversified when the natural light or the light emitting means is selected for information presentation, compared with the conventional electronic watch employing the two polarizers.

Although the conventional watch presents numeric information and the like in black only when it selects either the natural light or the emission of the light emitting element, the electronic watch of the present invention works in an ordinary mode of display presenting numeric information and the like in black when the natural light is used but presents numeric information and the like in a color unique to the light emitting element when it is used. This means that the light emitting element selects a desired color from among a variety of display colors to match an information presentation situation.

For example, when the electronic watch is a digital wristwatch, it may select a red color which is easily recognizable against the black background when numeric information and the like are presented under dark nighttime or other environments. When the electronic watch is applied as a diver's wristwatch for underwater use, it may give warning messages in an outstanding color such as yellow to alert a diver to water pressure and diving time, for example.

When the ordinary polarizer is replaced with the second polarization separator that transmits linearly polarized light polarized in one direction and reflects linearly polarized light polarized in a direction perpendicular to the one direction, the light, which is absorbed or dispersed through the polarizer in the conventional watch, contributes to the presentation of information by reflection, and as a result, the background of the watch is brightened, increasing the contrast of numeric information and the like. This serves well aged people who typically may have low vision.

In the electronic watch, a semi-transmissive layer may be arranged between the second polarization separator and the light emitting element. There are times when the natural light picked up by the first polarization separator is transmitted through the polarization changing element and the second polarization separator and reaches the surface of the light emitting element (the arrow Q in FIG. 1) in the electronic watch of the present invention, and then the light is irregularly reflected on the surface of the light emitting element. Since the strength of light exiting from the irregular reflection area drops, numeric information and the like may be presented there taking advantage of this area. Since only part of irregularly reflected light exits from the information display area, the contrast there is reduced accordingly, and information display for numbers and the like is thus difficult to recognize.

With the semi-transmissive layer arranged between the second polarization separator and the light emitting element, the light is absorbed by the semi-transmissive layer, the luminance of the presented information is sufficiently reduced, and as a result, a high contrast is assured for the displayed numeric information and the like.

In the electronic watch, a light scattering layer is arranged between the first polarization separator and the light emitting element. There are times when the natural light picked up by the first polarization separator is transmitted through the polarization changing element and reflected from the second polarization separator and exits externally (the arrow P in FIG. 1). With nothing lying in the optical path between the polarization changing element and the second polarization separator, the reflected light exits in a specularly reflected state, and a viewer views a specularly reflected image, which is not preferable for a mode of display of a time counting device. With the light scattering layer arranged in the optical path, the viewer recognizes a white image instead of a specularly reflected image, and the electronic watch as a time counting device thus provides a mode of display easy to recognize.

In the electronic watch, the light emitting element preferably emits at least one of orange, red and yellowish green light rays. In the conventional electronic watch that includes a pair of polarizers, information is presented in black only because the presentation of the numeric information and the like is performed through the state of light absorption. In contrast, the electronic watch of the present invention presents numeric information and the like by the emission of the light emitting element, and if emission colors of the light emitting element other than black are arranged, numeric information and the like are presented in a particular color other than black. Especially when an emission color is selected from among orange, red and yellowish green, it is eye-catching and produces an outstanding display.

Whether the emission color of the light emitting elements is either monochrome or multi-colored is not mentioned in the above discussion. In connection with this, the emission surface of the light emitting element is divided into several partitions or regions, with these partitions emitting multi-colored light. When numeric information and the like are presented using the light emitting element, a plurality pieces of information are provided in several colors, and a diversified mode of display is provided to meet various demands.

In the above electronic watch, the emission color itself of the light emitting element may be varied when the light emitting element emits lights of a plurality of colors, and the light emitting element may include a white light source and a color filter. The use of a color filter permits the light emitting element to emit multi-colored light even when the light emitting element is a typical white light source.

In the above electronic watch, the second polarization separator may be constructed of a diversity of polarization separator elements as described above, and is preferably constructed of a polarization separating film having a structure disclosed in International Publication Nos. WO95/17692 and WO95/27919. As shown in FIG. 2, the polarization separating film has a multi-layered structure into which two types of layers A and B are alternately laminated, and two adjacent ones of the layers have a same refractive index in one direction, and have a different refractive index in a direction perpendicular to the one direction, and the plurality of layers have a varying thickness from layer to layer.

To achieve the second object, another electronic watch of the present invention for counting and presenting time comprises (a) a first polarization separator which transmits therethrough linearly polarized light polarized in one direction while not transmitting therethrough linearly polarized light polarized in a direction perpendicular to said one direction, (b) a polarization changing element, disposed at a position for receiving the linearly polarized light from the first polarization separator, for selecting between a state in which a polarization axis is changed and a state in which the polarization axis is not changed, (c) a second polarization separator, diametrically opposed to the first polarization separator with the polarization changing element interposed therebetween, that transmits linearly polarized light polarized in a second direction and reflects linearly polarized light polarized in a direction perpendicular to said second direction, (d) a light emitting element that emits light to the polarization changing element through the second polarization separator, and (e) wherein the light emitting element emits light of a plurality of different colors to the polarization changing element.

The feature common to the two electronic watches is that the light emitting element is used. In the first described electronic watch, however, the light emitting element is not limited to any particular construction, while the light emitting element in the second described electronic watch is limited to the one which emits light of a plurality of different colors. The light emitting element emits light of plurality of colors according to the present invention, and the background is divided into a plurality of partitions or regions, with these partitions emitting respective differently colored light in the mode of display, and a novel display drawing the viewer's attention thus results.

Contemplated are a variety of methods of emitting light of a plurality of different colors with the emitting element. For example, a plurality of light sources that emit light of different colors may be incorporated in the light emitting element. With a plurality of light sources for different colors arranged in this way, color light emission areas selectively emit color light serving the purpose of diversifying the mode of display, compared with the arrangement in which a plurality of light emission areas are concurrently lit or extinguished.

Also available as a method of emitting light of a plurality of different colors with the light emitting element, is to incorporate a plurality of types of color filters which selectively transmit different color light. Using the color filters to partition in color the emission by the light emitting element, a color partitioning pattern may be formed to any desired pattern.

In the above-described electronic watch, the second polarization separator transmits linearly polarized light polarized in a second direction while not absorbing but reflecting linearly polarized light polarized in a direction perpendicular to said second direction.

In this way, the first polarization separator, farther from the light emitting element, is constructed of an ordinary polarizer, and the second polarization separator, nearer to the light emitting element, is constructed of the above-described reflective-type polarization separator so that a mode of display for presenting numeric information and the like by means of the emission of the light emitting element is provided. In such a case, the light emitting element emits light of plurality of colors according to the present invention, and numeric information and the like are presented in a plurality of colors in the mode of display, and a novel display drawing the viewer's attention thus results.

With the second polarization separator constructed of the reflective-type polarizing element, the ON/OFF operation of the light emitting element instantaneously changes to different colors the color of the background and display color of the numeric information and the like on a time counting screen, and an interesting and novel mode of display is thus provided.

In the electronic watch constructed as described above, the plurality of colors emitted by the light emitting element is not limited to particular colors, and they preferably include orange, red and yellowish green. These colors are eye-catching and outstanding. When the reflective-type polarization separator is used as the second polarization separator, the numeric information and the like are presented by means of the emission of the light emitting element, and the background color is typically "black." Since orange, red and yellowish green are very outstanding against the black background, the emission colors are preferably selected from these colors when the reflective-type polarization separator is used as the second polarization separator.

In the electronic watch, the color light sources are selectively lit, and a background display area and information display area for numbers and the like are presented not only in white or black but also in a variety of desired colors, thereby providing a novel display drawing the viewer's attention.

In the above-described electronic watch, emissions of different colors may be preferably presented in a color mixture in a naked-eye vision state. The naked-eye vision state means that the viewer observes the watch with his or her naked eyes, typically at a distance still permitting his or her vision to focus on the display of the watch, for example, at a distance of 15 cm or so apart from the watch. In the color mixture display, a variety of colors up to the viewer's desire may be presented.

In the above-described electronic watch, the color mixture state in the color mixture presentation preferably changes. For example, when red and green are mixed, a red-based color is preferably changed to a green-based color and vice versa at a proper timing. With this arrangement, the viewer's attention is quickly drawn to the watch.

When the color mixture state in the color mixture presentation is changed in the electronic watch, the change in the color mixture state may be automatically made at predetermined time intervals. For example, both red and green may be mixed, the ratio of mixture of red and green may be changed from the red-based color to the green-based color at several steps at regular intervals and vice versa. With this arrangement, the viewer sees the gradual and automatic change of the background color or the like of the electronic watch.

In the above-described electronic watch, the changing of the color mixture state in the color mixture presentation may be performed by changing the emission strength of each color light source in the light emitting element. Available as a method for changing the emission strength is changing the duty factor of a current supplied to the light source.

In the above-described electronic watch, the changing of the color mixture state in the color mixture presentation is performed by changing the emission area of each color light source in the light emitting element.

In the electronic watch, the light source may be an EL (electroluminescence) element, an LED (light emitting diode) and a lamp, or a combination of thereof.

In the electronic watch, the liquid crystal cell may comprise (a) a first polarization separator which transmits therethrough linearly polarized light polarized in one direction while not transmitting therethrough linearly polarized light polarized in a direction perpendicular to said one direction, (b) a polarization changing element, disposed at a position for receiving the linearly polarized light from said first polarization separator, that selects between a state in which a polarization axis is changed and a state in which the polarization axis is not changed, and (c) a second polarization separator, diametrically opposed to said first polarization separator with said polarization changing element interposed therebetween, that transmits linearly polarized light polarized in a second direction and reflects linearly polarized light polarized in a direction perpendicular to said second direction.

In the above arrangement, the first polarization separator is constructed of an ordinary polarizer. The ordinary polarizer may be a film member which outputs a linearly polarized light polarized in one direction in response to an incident natural light, and may be produced by interposing a polarizing layer between protective layers of TAC (cellulose triacetate).

The polarization changing element may be constructed of a liquid crystal element having the structure that liquid crystal is interposed between a pair of light transmissive substrates each having a light transmissive electrode. The liquid crystal may be any of variety of liquid crystals including a TN (Twisted Nematic) liquid crystal, an STN (Super-Twisted Nematic) liquid crystal, and an ECB (Electrically Controlled Birefringence) liquid crystal. The STN liquid crystals include the one employing color compensation optically anisotropic material, such as an FSTN (Film Compensated Super-Nematic) liquid crystal.

In this embodiment, the first polarization separator has the function that it "transmits linearly polarized light polarized in one direction while not transmitting polarized light other than that light, by absorption and dispersion," and in contrast, the second polarization separator has the function that it "transmits linearly polarized light polarized in one direction while reflecting the remaining polarized light, particularly, totally reflecting the linearly polarized light polarized in a direction perpendicular to the polarization axis of the light linearly polarized in the one direction."

The second polarization separator may be one of (1) the polarization separating film of a multi-layered structure of films as disclosed in International Publication Nos. WO95/17692 and WO95/27919, (2) a polarization separator having a cholesteric liquid crystal with a λ/4 phase plate on one side or on both sides, (3) a polarization separator for separating a light into a reflected polarized light and a transmitted polarized light taking advantage of the Brewster's angle (SID 92 DIGEST, pages 427 to 429) and (4) a polarization separator employing a hologram.

If the second polarization separator is characteristically identical to the first polarization separator, light absorption takes place in the two polarization separators, and the amount of light available for time display substantially drops. In this embodiment, the second polarization separator is constructed of a polarization separator that transmits light linearly polarized in one direction while not absorbing but reflecting other linearly polarized light, and the light reflected from the second polarization separator contributes to time display, substantially brightening the time display screen.

DETAILED DESCRIPTION OF PREFERRED EMBODIMENTS

Figure 4:
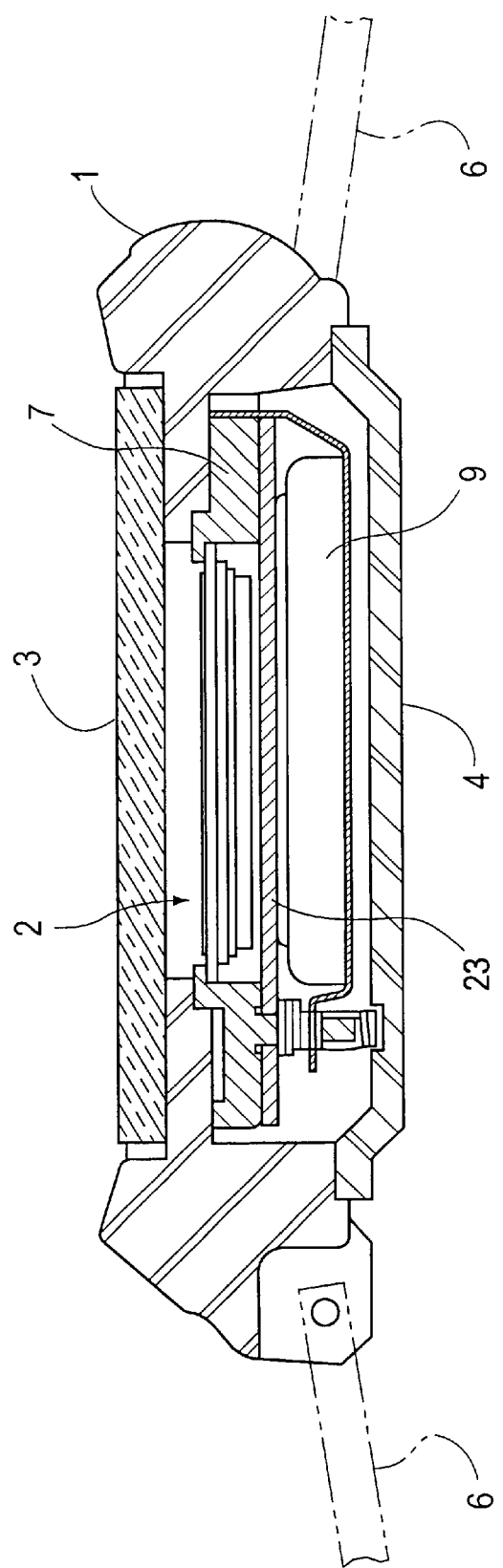
FIG. 4 is a cross-sectional view showing the section of one embodiment of the electronic wristwatch as one embodiment of the electronic watch of the present invention.

FIG. 4 is a cross-sectional view of the construction of an electronic wristwatch of one embodiment of the electronic watch of the present invention. The wristwatch comprises, for example, a plastic case 1, an assembly 2 housed in the inside of the case 1, a glass cover 3 arranged above the assembly 2 and secured to the case 1, and a bottom cover 4 for supporting the assembly 2. Designated reference numeral 6 is a wrist strap.

Figure 6:
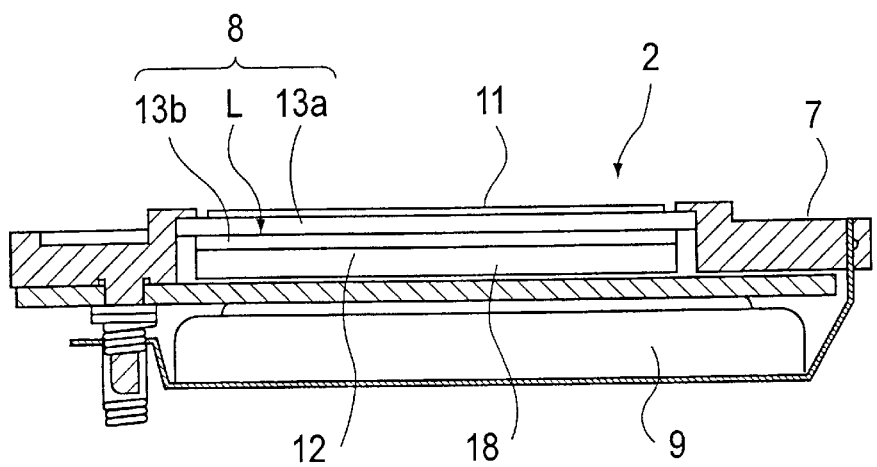
FIG. 6 is a cross-sectional view of the assembly of FIG. 5.

Referring to FIG. 6, the assembly 2 comprises a panel frame 7, a liquid crystal element 8 as a polarization changing element supported by the panel frame 7, a polarizer 11 as a first polarization separator glued onto the external surface (top surface in FIG. 6) of the liquid crystal element 8, a polarization separating film 12 as second polarization separator opposed to the polarizer 11 with the liquid crystal element 8 therebetween, a back light 18 as light emitting device arranged on the underside of the polarization separating film 12, and a battery 9.

Figure 2:
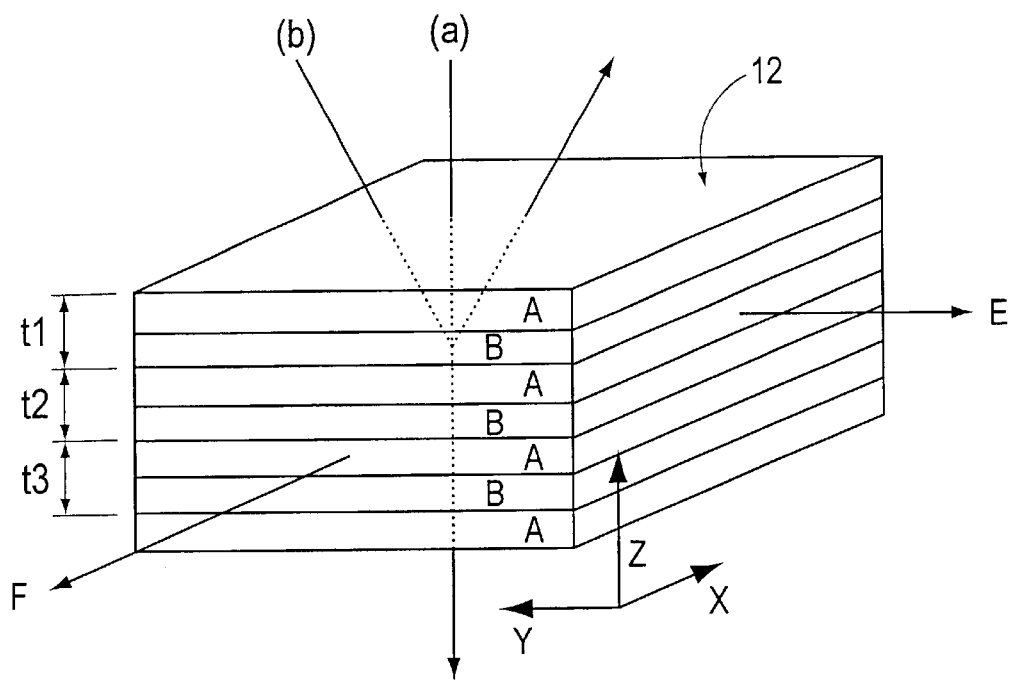
FIG. 2 is a perspective view showing the internal structure of a polarization separating film that is used a major component of the electronic watch of FIG. 1.

The polarizer 11 transmits linearly polarized light polarized in a first direction while not transmitting other polarized light by absorbing or dispersing the light. The polarization separating film 12 has a multi-layered structure in which a plurality of films are laminated as shown in FIG. 2. As described below, the polarization separating film 12 transmits light linearly polarized in a first direction while not transmitting but reflecting the remaining polarized light, particularly, totally reflecting the light linearly polarized in a second direction perpendicular to the first direction. The back light 18 is constructed of EL that is a plane light emitting element. The surface of the back light 18 may be an irregularly reflective surface and its color may be gray.

Referring to FIG. 2, considering three mutually perpendicular axis directions XYZ, two layers A and B are laminated using an extrusion molding technique, and stretched in one direction (X direction, for example), but not stretched in another direction (Y direction, for example). Namely, the X direction is a stretching direction, and the Y direction is transverse to it. The material of the B layer has a refractive index of $n_B$ ($n_B$=1.64, for example), and remains unchanged regardless of the stretching process. On the other hand, the material of the A layer has a refractive index varying through the stretching process. When a sheet of the A material is stretched in one axis, for example, it has a refractive index of $n_{AX}$ ($n_{AX}$=1.88, for example) in the stretching direction (the X direction, for example) and a different refractive index of $n_{AY}$ ($n_{AY}$=1.64, for example) in the transverse direction (the Y direction).

When the multi-layered structure constructed of A and B materials shown in FIG. 2 is stretched in the X direction, a large refractive index difference $\Delta n$=1.88−1.64=0.24 is generated in the stretching direction. On the other hand, the refractive index difference between A and B layers in the Y direction perpendicular to the stretching direction is $\Delta n$=1.64−1.64=0, and thus no refractive index difference takes place. For such optical characteristics, when light is incident on the polarization separating film 12, a polarized component (a) having a transmission axis E of the incident light is transmitted through the polarization separating film 12. A polarized component (b) having an absorption axis F of the incident light is subject to the refractive index difference $\Delta n$, and is reflected therefrom for this reason.

Figure 3:
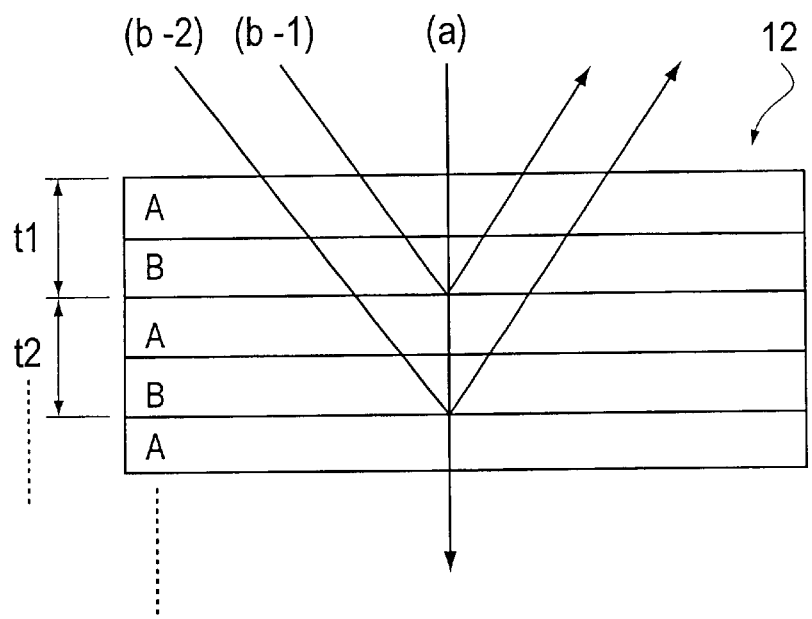
FIG. 3 diagrammatically shows the operation of the polarization separating film shown in FIG. 2.

The layers A and B are individually slightly varied to have thicknesses of t1, t2, t3, . . . , and for this reason, light of different wavelengths (b–1), (b–2), . . . is reflected from layer boundaries as shown in FIG. 3. More particularly, light in a wide wavelength range is reflected by the multi-layered structure of two types of layers of A and B.

If the layers of thicknesses of t1, t2, t3, . . . are combined such that light of virtually all wavelengths are reflected, a finally obtained reflected light is a white light. On the other hand, if a combination of the layers of thicknesses of t1, t2, t3, . . . is appropriately set up, a desired wavelength, namely, a light of a desired color is selectively reflected by the polarization separating film 12.

Since the polarization separating film 12 is manufactured to be extremely thin with flexibility imparted thereto, the overall thickness of the electronic watch is made thin, and its manufacturing process is simplified.

Figure 5:
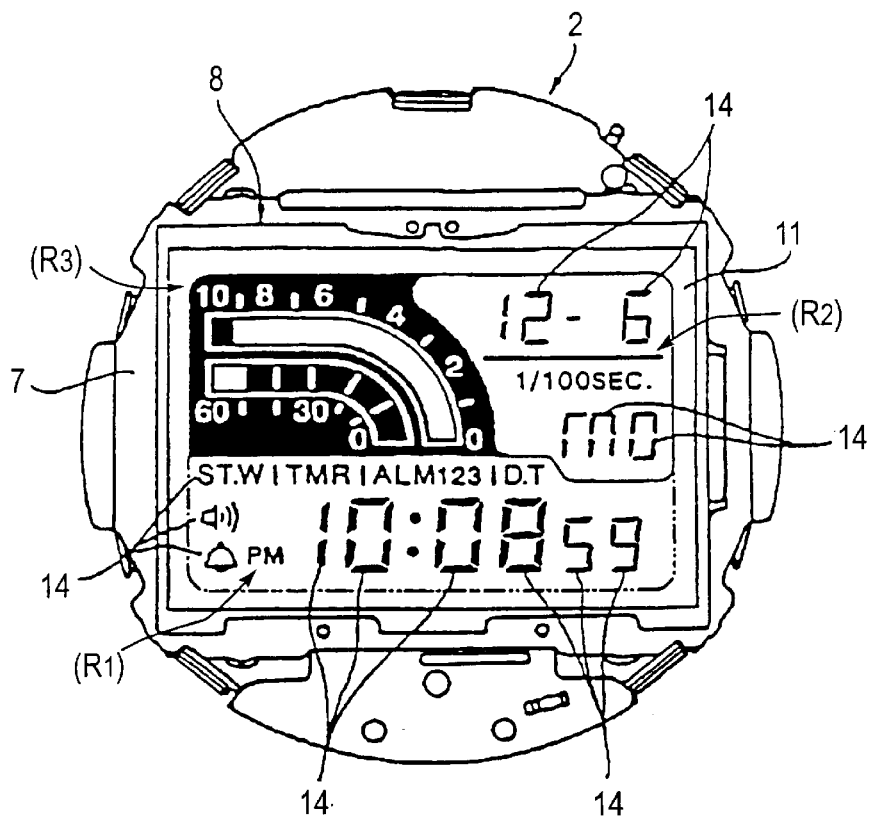
FIG. 5 is a plan view showing the assembly used in the electronic wristwatch of FIG. 4.

The liquid crystal element 8 comprises a pair of opposing light transmissive substrates, for example, transparent glass substrates 13a and 13b, and a gap formed between the two glass substrates, namely a cell gap, that is filled with a liquid crystal, for example, a TN liquid crystal L. The glass substrates 13a and 13b are provided with a plurality of light transmissive electrodes 14 to present numeric information and the like as shown in FIG. 5. In this embodiment, seven-segment light transmissive electrodes 14 are used to present one digit numeric characters.

The mutually opposing light transmissive electrodes 14, formed on each of the pair of glass substrates 13a and 13b, are supplied with a predetermined voltage, and whether the voltage is applied (ON) or not applied (OFF) sets which of the two states the liquid crystal L takes in its alignment. The liquid crystal of this embodiment does not vary the polarization axis of the linearly polarized light when in its ON state, while it twists the polarization axis of the linearly polarized light by 90° when in its OFF state.

The operation of the electronic watch thus constructed is now discussed. The electronic watch has two light source modes: in one mode, the emission of the back light 18 is used, and in the other mode, the natural ambient light is used without using the emission of the back light 18. To keep white the background of the display screen of the wristwatch, a related area of the liquid crystal element 8 is set to be in an OFF state, and to present numeric information and the like on the display screen, a related area of the liquid crystal element 8 is set to be in an ON state. Various cases of operation are now discussed.

Figure 1:
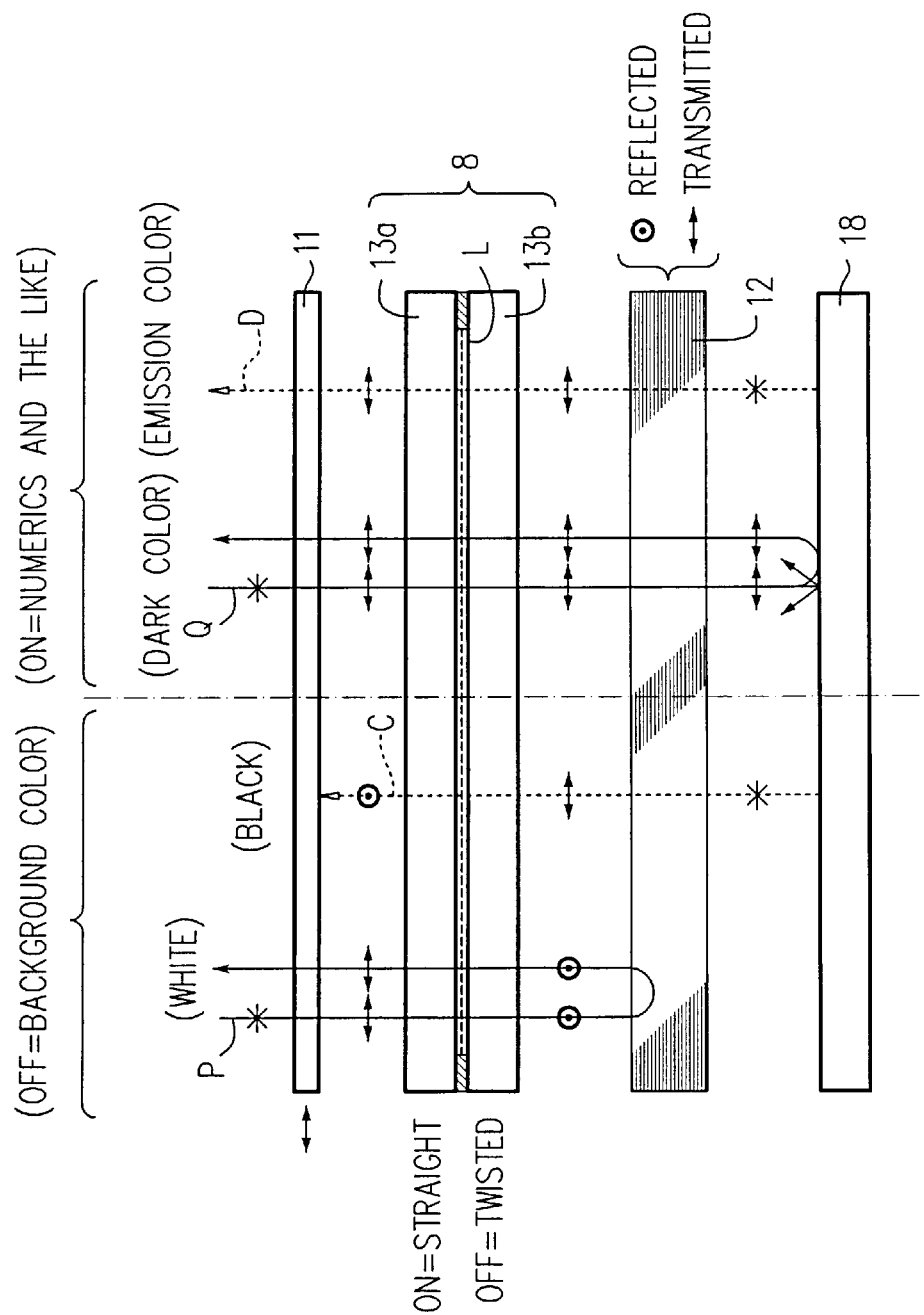
FIG. 1 diagrammatically shows a major portion of one embodiment of the electronic watch of the present invention.

When the natural ambient light is used to present the white background, the liquid crystal element 8 is turned to the OFF state in FIG. 1. As shown by an arrow P, linearly polarized light polarized in a direction parallel to the page of FIG. 1, out of an external light, namely, the natural light is transmitted through the polarizer 11, and is twisted by 90° in a polarization direction by the liquid crystal element 8 at an OFF state, thereby becoming linearly polarized light polarized in a direction perpendicular to the page of FIG. 1. The linearly polarized light is reflected from the respective interlayer surfaces of the polarization separating film 12 depending on their wavelengths, and then transmitted through the liquid crystal element 8 and polarizer 11 and then externally presented. In this way, the "white" background is presented on the display screen of the wristwatch.

When the natural ambient light is used to present the numeric information and the like, the liquid crystal element 8 is turned to the ON state. As represented by an arrow Q, linearly polarized light polarized in a direction parallel to the page of FIG. 1, out of the external light, is taken out by the polarizer 11, and is transmitted through the liquid crystal element 8. Since the liquid crystal element 8 is at an ON state, the linearly polarized light keeps its polarization direction parallel to the page of FIG. 1 without being twisted, and is thus transmitted through the polarization separating film 12, and irregularly reflected on the surface of the back light 18. The irregular reflection reduces the amount of light returning back to the polarizer 11, and the corresponding area is recognized as gray or dark from the outside, and the viewer recognizes it as numeric information and the like.

When the back light 18 is used to present the background color, the back light 18 is lit and the liquid crystal element 8 is turned to an OFF state. As represented by an arrow C, linearly polarized light polarized in a direction parallel to the page of FIG. 1, out of the emission of the back light 18, namely randomly polarized light, is picked out by the polarization separating film 12, and is twisted by 90° in polarization direction by the liquid crystal element 8 at an OFF state, thereby becoming linearly polarized light polarized in a direction perpendicular to the page of FIG. 1. This linearly polarized light is prevented from exiting outward as a result of being absorbed or dispersed by the polarizer 11, and is recognized as a "black" background color when viewed from the outside.

When the emission of the back light 18 is used to present numeric information and the like, the back light 18 is lit and the liquid crystal element 8 is turned to an ON state. As represented by an arrow D, linearly polarized light polarized in a direction parallel to the page of FIG. 1, out of the emission of the back light 18, is picked out by the polarization separating film 12, is transmitted through the liquid crystal element 8 and then the polarizer 11, and then presented externally.

Using the emission of the back light 18 in this way, time and other alphanumeric information of the emission color of the back light 18 is presented against the black background. For example, when the back light 18 emits a red light, the information is presented in red against the black background. This setting offers a distinctly recognizable display, compared with the case in which information in black is presented against a white background during nighttime.

Such a mode of display is useful when a warning is displayed on a diver's watch. More specifically, the back light 18 may be set to emit an eye-catching color of light, for example, yellow light, and when the situation in water pressure and diving time creates the need for a warning, the back light 18 emits yellow light to give a yellow warning display against the black background, thereby effectively alerting the diver to the situation.

Any color as the emission color of the back light 18 may be selected from a variety of colors, meeting the viewer's demand. For example, when orange, red and yellowish green are selected, these colors are distinct against the black background, and the mode of display is easily recognizable to the viewer. A great difference takes place in the mode of display between when the back light 18 is used and when the back light 18 is not used, drawing the user's attention and thereby making the electronic watch quite useful.

The back light 18 may emit a monochromatic light, or emit generally multi-color light with several partitions emitting respective color light. With the multi-color light emitted, the back light 18 presents a variety of information including numeric information in different colors, and the watch therefore presents a variety of modes of display meeting a variety of requirements.

Figure 21:
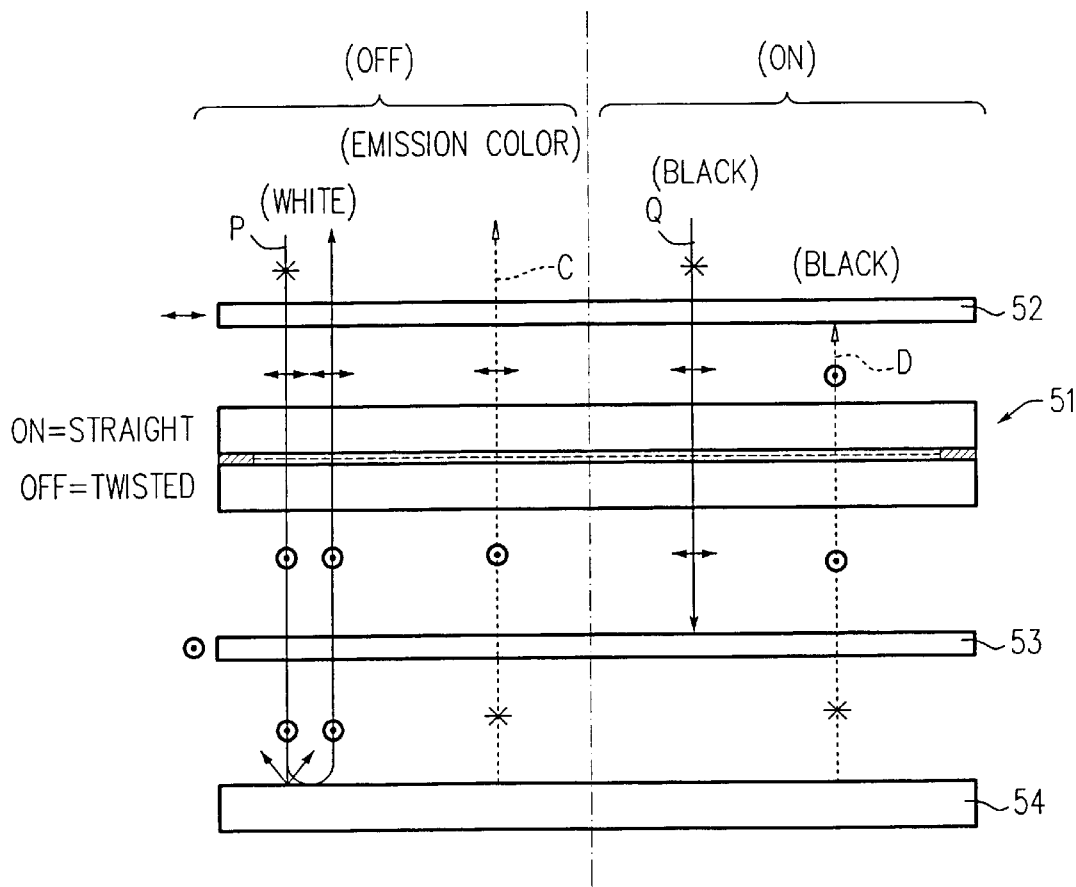
FIG. 21 diagrammatically shows a major portion of one example of conventional electronic watch.

When the white background is presented based on the ambient light in the conventional watch shown in FIG. 21, the external light, when going and returning, is transmitted through the polarizer 53 twice as represented by the arrow P. When the external light is transmitted through the polarizer 53 twice, the luminance of the white background drops, darkening the display on the wristwatch. In the wristwatch of this embodiment, the white background is presented taking advantage of the natural ambient light that is reflected from the polarization separating film 12 as represented by the arrow P in FIG. 1, and the amount of light absorbed by the polarizer is reduced, and the white background is brightly presented. This arrangement presents a distinctly recognizable display to aged people who typically have low vision.

Figure 7:
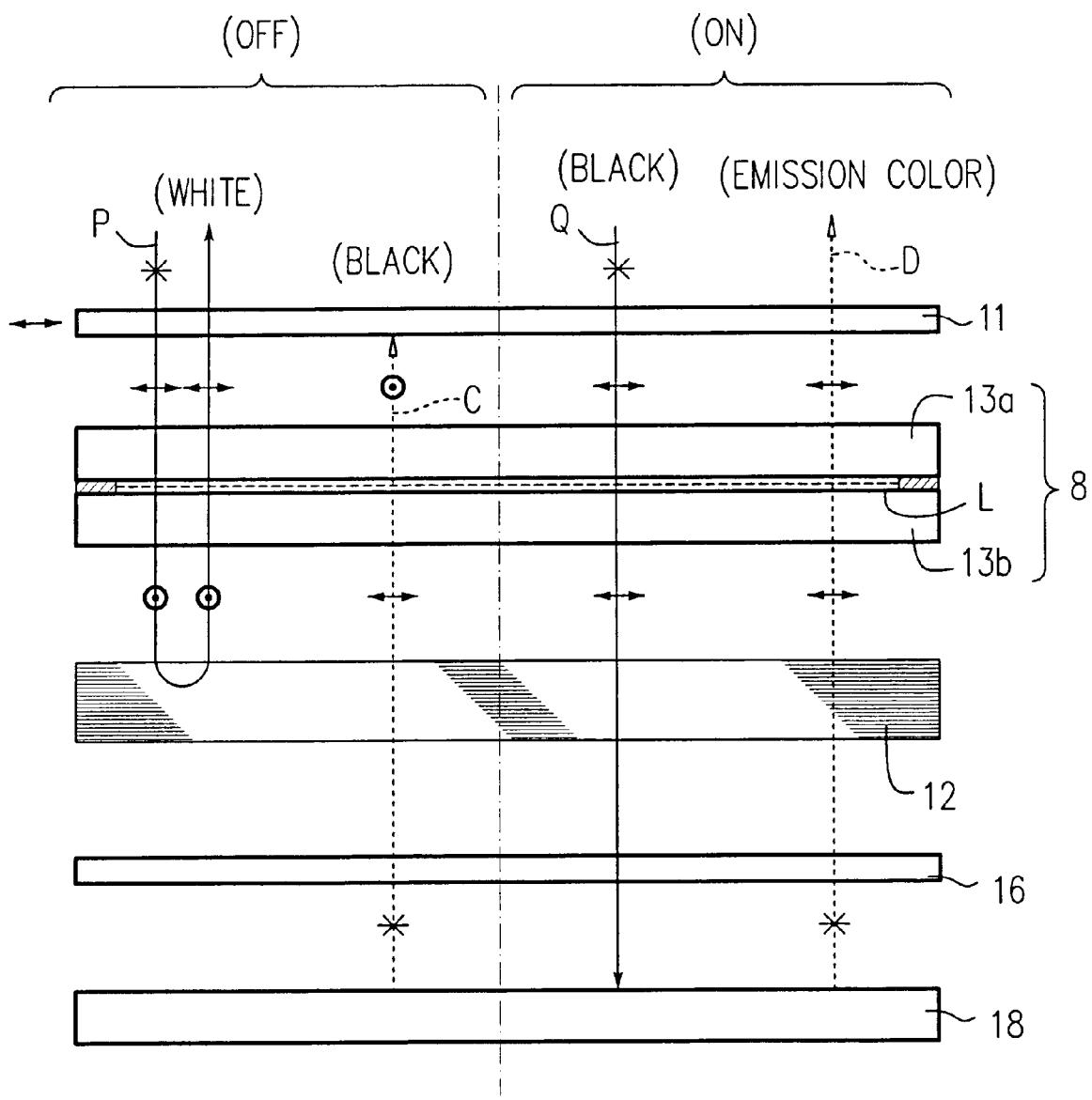
FIG. 7 diagrammatically shows a major portion of another embodiment of the electronic watch of the present invention.

FIG. 7 shows a major portion of a second embodiment of the electronic watch of the present invention according to Claim 1. This embodiment is different from the preceding embodiments shown in FIG. 1 in that a semi-transmissive layer 16 is arranged between the polarization separating film 12 and the back light 18. The semi-transmissive layer 16 may be constructed of a gray semi-transmissive, light-absorbing material or a black, light-absorbing material that has a plurality of holes for letting light transmit therethrough.

In this embodiment, the natural ambient light is used, and the liquid crystal element 8 is turned to an ON state to present numeric information and the like. As represented by the arrow Q, the linearly polarized light from the polarization separating film 12 is absorbed or dispersed by the semi-transmissive layer 16, and the corresponding area is presented in black. This embodiment presents numeric information and the like in higher contrast than the first embodiment in which numeric information and the like are presented taking advantage of the irregular reflection of light on the surface of the back light 18 as represented by the arrow Q in FIG. 1.

Figure 8:
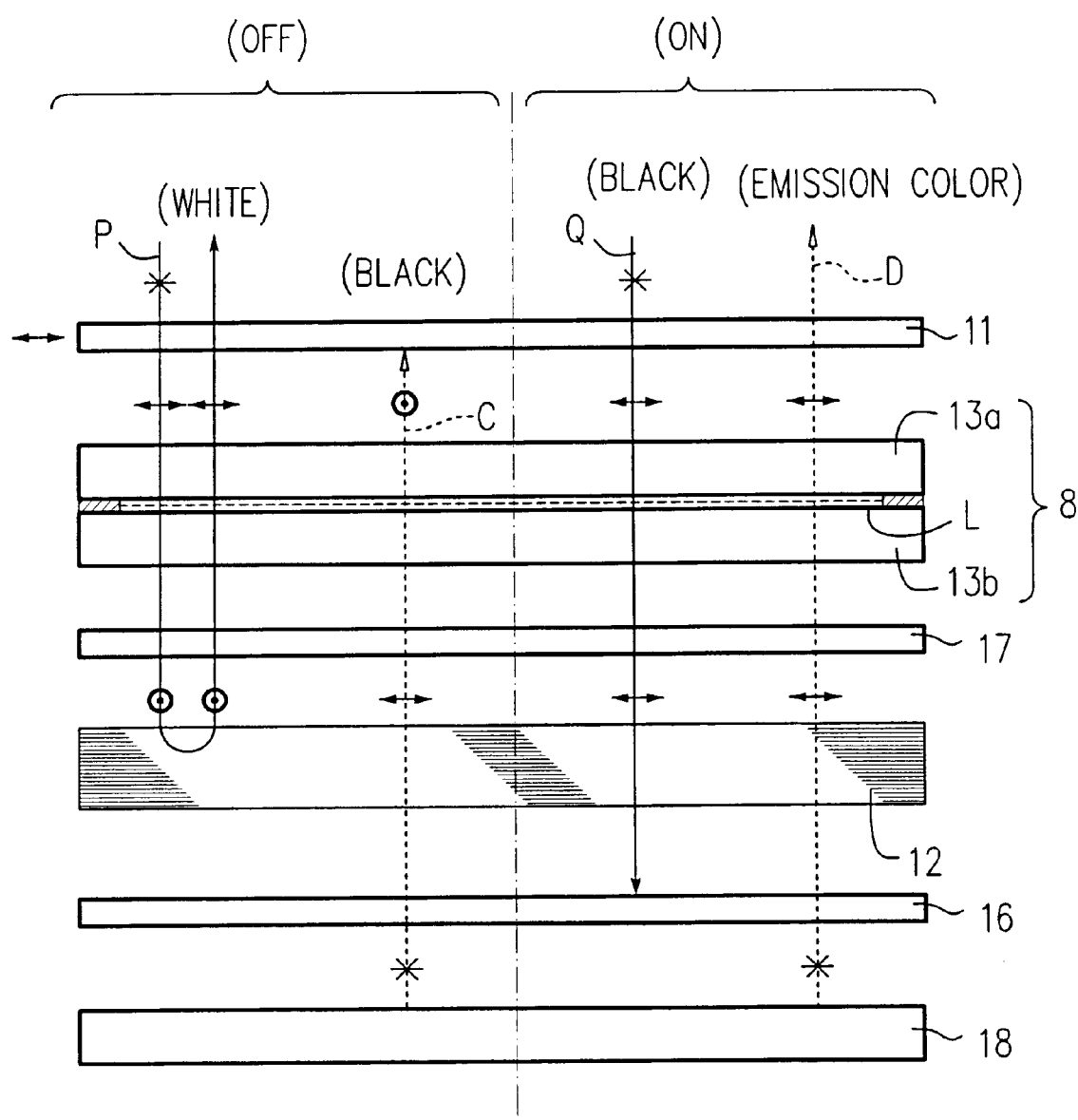
FIG. 8 diagrammatically shows a major portion of yet another embodiment of the electronic watch of the present invention.

FIG. 8 shows a third embodiment of the electronic watch of the present invention. The third embodiment is different from the first embodiment shown in FIG. 1 in that the semi-transmissive layer 16 is arranged between the polarization separator film 12 and the back light 18 and in that a light scattering layer 17 is arranged between the liquid crystal element 8 and the polarization separating film 12. According to the third embodiment, the light scattered or diffused by the light scattering layer 17 helps present the background as distinctly white.

Although several preferred embodiments of the electronic watch have been discussed, the present invention is not limited to these embodiments, and various other embodiments are possible within the scope of the invention.

In the above embodiments, the present invention is implemented in the wristwatch, but the present invention may be implemented in other types of electronic watches such as a stopwatch. Furthermore, a light emitting device other than an EL light emitting device may be used.

In the above embodiments, the liquid crystal element using the TN liquid crystal is used as the polarization changing element that switches between the state in which the polarization axis of the polarized light is changed and the state in which the polarization axis of the polarized light is not changed, and instead of this liquid crystal, the liquid crystal element using the STN liquid crystal or ECB liquid crystal may be used.

The multi-layered structure in which a plurality of films are laminated as shown in FIG. 2 is used as the second polarization separator that transmits the linearly polarized light in a first direction while reflecting the linearly polarized light in a direction perpendicular to the first direction. Instead of this, the second polarization separator may be one of (1) a polarization separator having a cholesteric liquid crystal with a λ/4 phase plate on one side or on both sides, (2) a polarization separator for separating a light into a reflected polarized light and a transmitted polarized light taking advantage of the Brewster's angle (SID 92 DIGEST, pages 427 to 429) and (3) a polarization separator employing a hologram.

Figure 9:
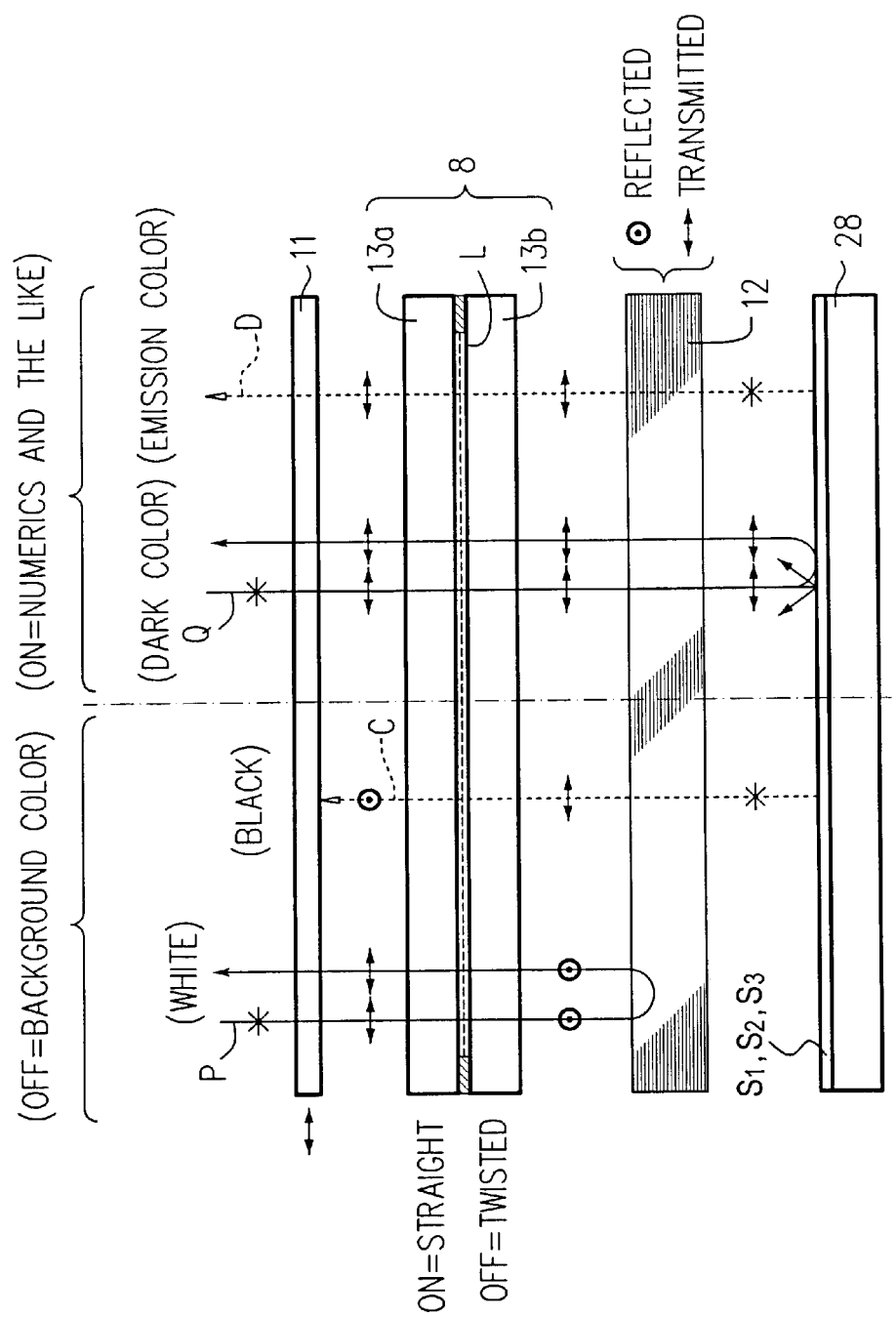
FIG. 9 diagrammatically shows a major portion of yet another embodiment of the electronic watch of the present invention.
Figure 10:
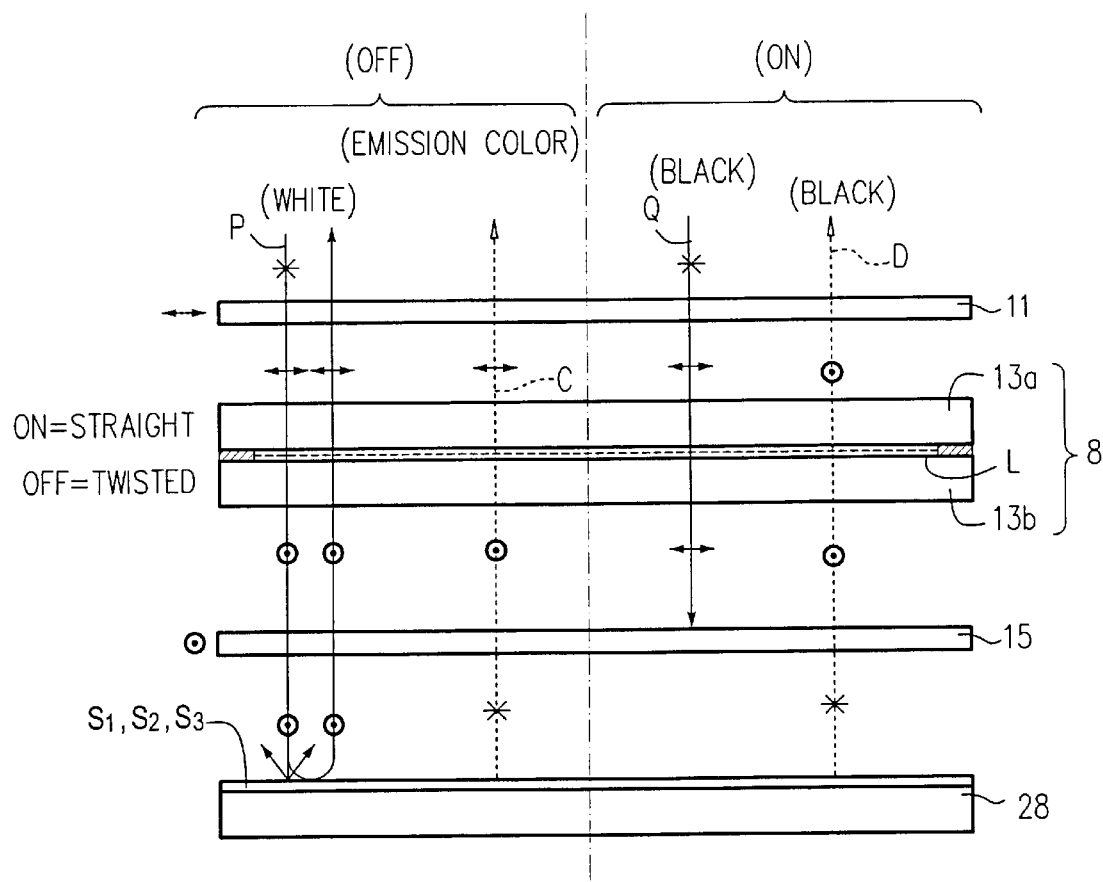
FIG. 10 diagrammatically shows a major portion of an embodiment of a conventional electronic watch.

FIG. 9 shows a major portion of a fourth embodiment of the electronic watch of the present invention, particularly of a display element of the electronic watch. The display element shown here may replace the display element shown in FIG. 1 in connection with the electronic watch shown in FIGS. 4, 5 and 6.

Figure 11:
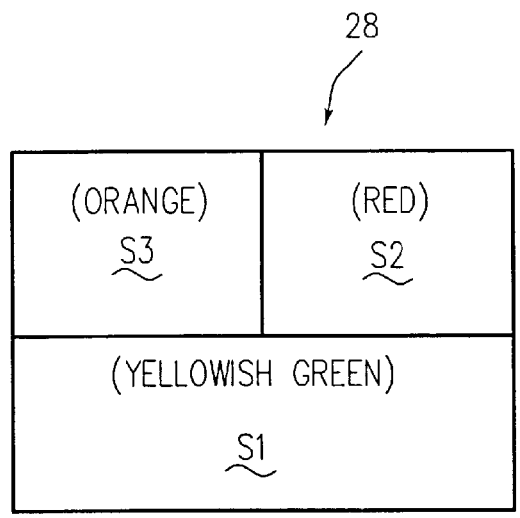
FIG. 11 is a plan view showing one embodiment of a light emitting element.

This embodiment has the following features. Namely, as shown in FIG. 5, the display screen of the liquid crystal element 8 is roughly divided into three regions: a first region R1 for displaying time and the like, a second region R2 for displaying date and the like, and a third region R3 for displaying the water pressure and other additional information. As shown in FIG. 9, three types of light transmissive prints S1, S2, and S3 different in color are formed on the surface of a back light 28 constructed of EL, and these prints constitute three emission areas S1, S2, and S3 emitting different color light respectively within the emission surface of the back light 28 as shown in FIG. 11.

The emission area S1 is arranged in alignment with the first region R1 of the liquid crystal element 8 shown in FIG. 5 and emits a yellowish green light; the emission area S2 is arranged in alignment with the second region R2 and emits a red light; and the emission area S3 is arranged in alignment with the third region R3 and emits an orange light. Since the back light 28 is constructed of a single EL element shown in FIG. 11, the three emission areas S1, S2 and S3 are concurrently lit or extinguished.

The operation of the electronic wristwatch thus constructed is now discussed. The electronic wristwatch has two light source modes: in one mode, the emission of the back light 28 is used, and in the other mode, the natural ambient light is used without using the emission of the back light 28. To keep white the background of the display screen of the wristwatch, the corresponding area of the liquid crystal element 8 is set to be in an OFF state, and to present numeric information and the like on the display screen, the corresponding area of the liquid crystal element 8 is set to be in an ON state. Various cases of operation are now discussed.

When the natural ambient light is used for presentation under light daylight conditions, particularly to present the background, the liquid crystal element 8 is turned to the OFF state in FIG. 9. As shown by an arrow P, light rays linearly polarized in a direction parallel to the page of FIG. 9, out of an external light, namely randomly polarized light is transmitted through the polarizer 11, and is twisted by 90° in polarization direction by the liquid crystal element 8 at an OFF state, thereby becoming linearly polarized light polarized in a direction perpendicular to the page of FIG. 9. The linearly polarized light is reflected from the respective layers of the polarization separating film 12 depending on its wavelength, and then transmitted through the liquid crystal element 8 and polarizer 11 and then externally presented. In this way, the background color is presented on the display screen of the wristwatch. The background color is typically "white."

When the natural ambient light is used to present the numeric information and the like, the liquid crystal element 8 is turned to the ON state. As represented by an arrow Q, linearly polarized light polarized in a direction parallel to the page of FIG. 9, out of the external light, is picked out by the polarizer 11, and is transmitted through the liquid crystal element 8. Since the liquid crystal element 8 is at an ON state, the linearly polarized light keep its polarization direction parallel to the page of FIG. 9 without being twisted, and is thus transmitted through the polarization separating film 12, and irregularly reflected on the surface of the back light 28. The irregular reflection reduces the amount of light returning back to the polarizer 11, and the corresponding area is recognized as relatively grayer or darker than the background color from the outside, and the viewer recognizes it as numeric information and the like.

As described above, numeric information and the like are presented in a darker color against the white background as in a typical case where the natural ambient light is used.

When the back light 28 is used for presentation which may be under dark nighttime conditions, particularly to present the background color, the back light 28 is lit and the liquid crystal element 8 is turned to an OFF state. As represented by an arrow C, linearly polarized light polarized in a direction parallel to the page of FIG. 9, out of the emission of the back light 18, namely randomly polarized light is picked out by the polarization separating film 12, and is twisted by 90° in polarization direction by the liquid crystal element 8 at an OFF state, thereby becoming linearly polarized light polarized in a direction perpendicular to the page of FIG. 9. This linearly polarized light is prevented from exiting outward as a result of being absorbed or dispersed by the polarizer 11, and is recognized as a "black" background color from the outside. Although the back light 28 emits yellowish green, red and orange colors respectively in the areas S1, S2, and S3 shown in FIG. 11, the colors recognized as the background color from the outside are all "black."

When the emission of the back light 28 is used to present numeric information and the like, the back light 28 is lit and the liquid crystal element 8 is turned to an ON state. As represented by an arrow D, linearly polarized light polarized in a direction parallel to the page of FIG. 9, out of the emission of the back light 18, is picked out by the polarization separating film 12, is transmitted through the liquid crystal element 8 at an ON state and then the polarizer 11, and is then presented externally. Since the color of the numeric information and the like is determined by the emission color of the back light 28, the information in the region R1 shown in FIG. 5 is presented in the emission color of the emission area S1, namely yellowish green; the information in the region R2 is presented in the emission color of the emission area S2, namely red; and the information in the region R3 is presented in the emission color of the emission area S3, namely orange.

As described above, time and other alphanumeric information are presented in each of yellowish green, red, and orange against the black background when the emission of the back light 28 is used, although other colors may be used.

As described above, the wristwatch of the present invention presents the information in black against the white background when the natural ambient light is used, and the information is presented in color like yellowish green against the black background when the back light 28 is used. In the conventional wristwatch shown in FIG. 21, the information is presented in black against the white background regardless of whether the natural ambient light or the back light is used, and compared with the conventional wristwatch, the mode of display in which the color of the numerical information and the like is switched between yellowish green or other colors and the standard black depending on whether the back light 28 is lit or extinguished is novel and appealing to the viewer.

The presented information is conventionally difficult to see when it is presented in black against the white background during nighttime, but in this embodiment, the information is easily recognized because the information is presented in yellowish green or another color against the black background with the back light 28 lit.

The mode of display of this embodiment is useful when a warning is displayed on a diver's watch, for example. More specifically, the back light 28 may be set to emit an eye-catching color light, for example, yellow light, and when the situation in water pressure and diving time, for example, creates the need for a warning, the back light 28 emits yellow light to give a yellow warning display against the black background, thereby effectively alerting the diver of the situation.

When the white background is presented based on the ambient light in the conventional watch shown in FIG. 21, the external light, when going and returning, is transmitted through the polarizer 53 twice as represented by the arrow P. When the external light is transmitted through the polarizer 53 twice, the luminance of the white background drops, darkening the display on the wristwatch. In the wristwatch of this embodiment, the white background is presented taking advantage of the natural ambient light that is reflected from the polarization separating film 12 as represented by the arrow P in FIG. 9, and the amount of light absorbed by the polarizer is reduced, and the white background is brightly presented. This arrangement presents a distinctly recognizable display, particularly to aged people who typically have low vision.

Figure 12:
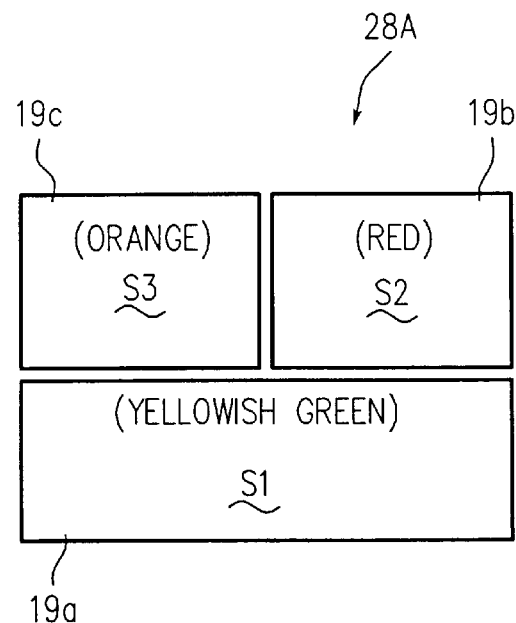
FIG. 12 is a plan view showing one modification of the light emitting element.

FIG. 12 shows a modification of the back light as the light emitting element. A back light 28A shown here has an emission area S1 constructed of EL element 19a emitting a yellowish green light, an emission area S2 constructed of EL element 19b emitting a red light, and an emission area S3 constructed of EL element 19c emitting an orange light. According to this modification, some or all of the emission areas S1, S2 and S3 are allowed to emit selectively lights, thereby diversifying the mode of display.

Figure 13:
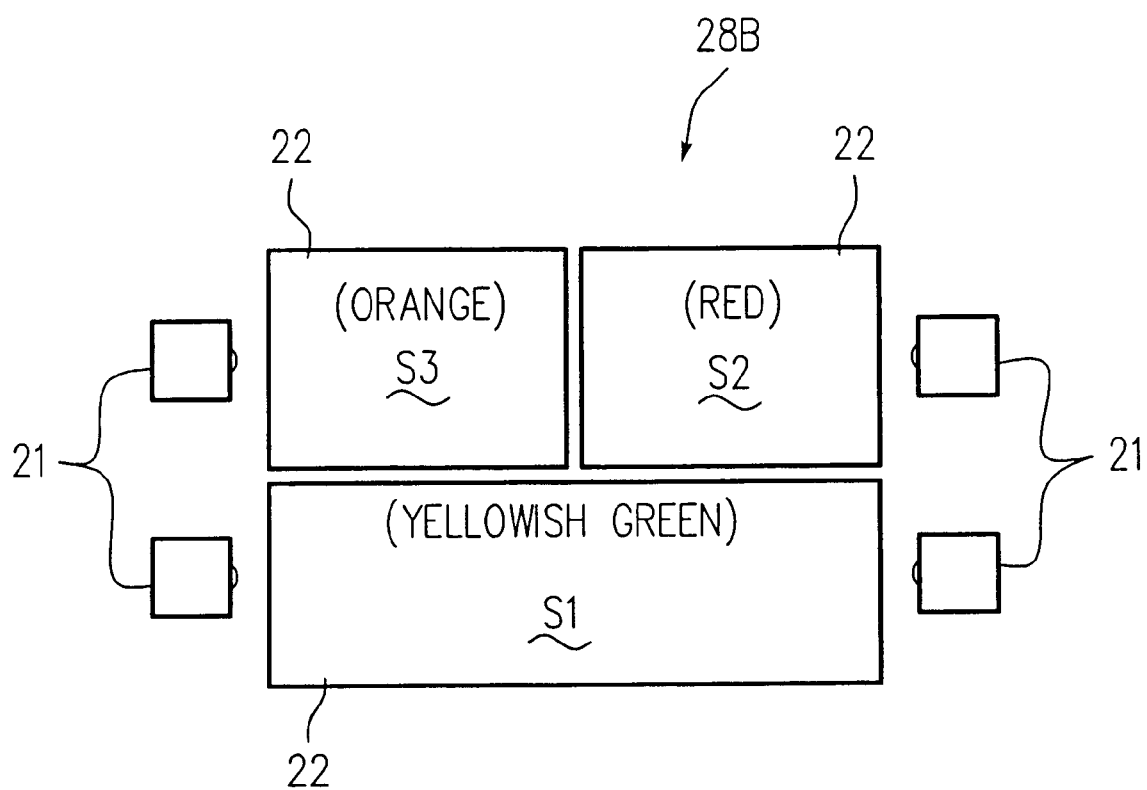
FIG. 13 is a plan view showing another modification of the light emitting element.

FIG. 13 shows another modification of the back light as the light emitting means. A back light 28B is constructed of LED 21 as point light sources, and plastic light guide plates 22. The light guide plates 22 have respective prints on their emission surfaces for emitting yellowish green, red and orange light, respectively. The light emission area S1, having an area larger than each of the emission areas S2 and S3, is provided with LED 21 on both ends of the respective light guide plate 22 to result in strong and uniform light emission over its wide area. A light reflector plate (not shown) is preferably arranged on each side of the light guide plate 22, except for the side where the light is introduced from LED 21.

Although the preferred embodiments of the electronic watch have been discussed, the present invention is not limited to these embodiments, and various other embodiments are possible within the scope of the invention.

In the above discussion, a plurality of light transmissive prints are formed on the white light source or a plurality of light sources emitting different color lights are arrayed to partition the emission from back lights 28 (FIGS. 9 and 11), 28A (FIG. 12), and 28B (FIG. 13) into a plurality of color lights. Alternatively, the emission layers S1, S2, and S3 shown in FIG. 9 are removed from the back light 28 to form it as a single white light source, and then a plurality of color filters are arranged on the emission surface of the back light 28 for selectively transmitting different color lights. The color pattern of the color filter is relatively flexibly made, and if the back light is color separated using the color filter, the color separation pattern of the back light is flexibly set to meet the display screen of the electronic watch even if its design is complex.

In the above embodiments, the present invention is implemented in the wristwatch, but the present invention may be implemented in other types of electronic watches such as a stopwatch.

In the above embodiments, the liquid crystal element using the TN liquid crystal is used as the polarization changing element that switches between the state in which the polarization axis of the polarized light is changed and the state in which the polarization axis of the polarized light is not changed, and instead of this liquid crystal, the liquid crystal element using the STN liquid crystal or ECB liquid crystal may be used.

In the above embodiment, the multi-layered structure into which a plurality of films are laminated as shown in FIG. 2 is used as the second polarization separator, namely, as a polarization separator for transmitting light linearly polarized in a first direction and reflecting light linearly polarized in a direction perpendicular to the first direction. Instead, the second polarization separator may be one of (1) a polarization separator having a cholesteric liquid crystal with a $\lambda/4$ phase plate on one side or on both sides, (2) a polarization separating member for separating a light into a reflected polarized light and a transmitted polarized light taking advantage of the Brewster's angle (SID 92 DIGEST, pages 427 to 429) and (3) a polarization separator employing a hologram.

Figure 15:
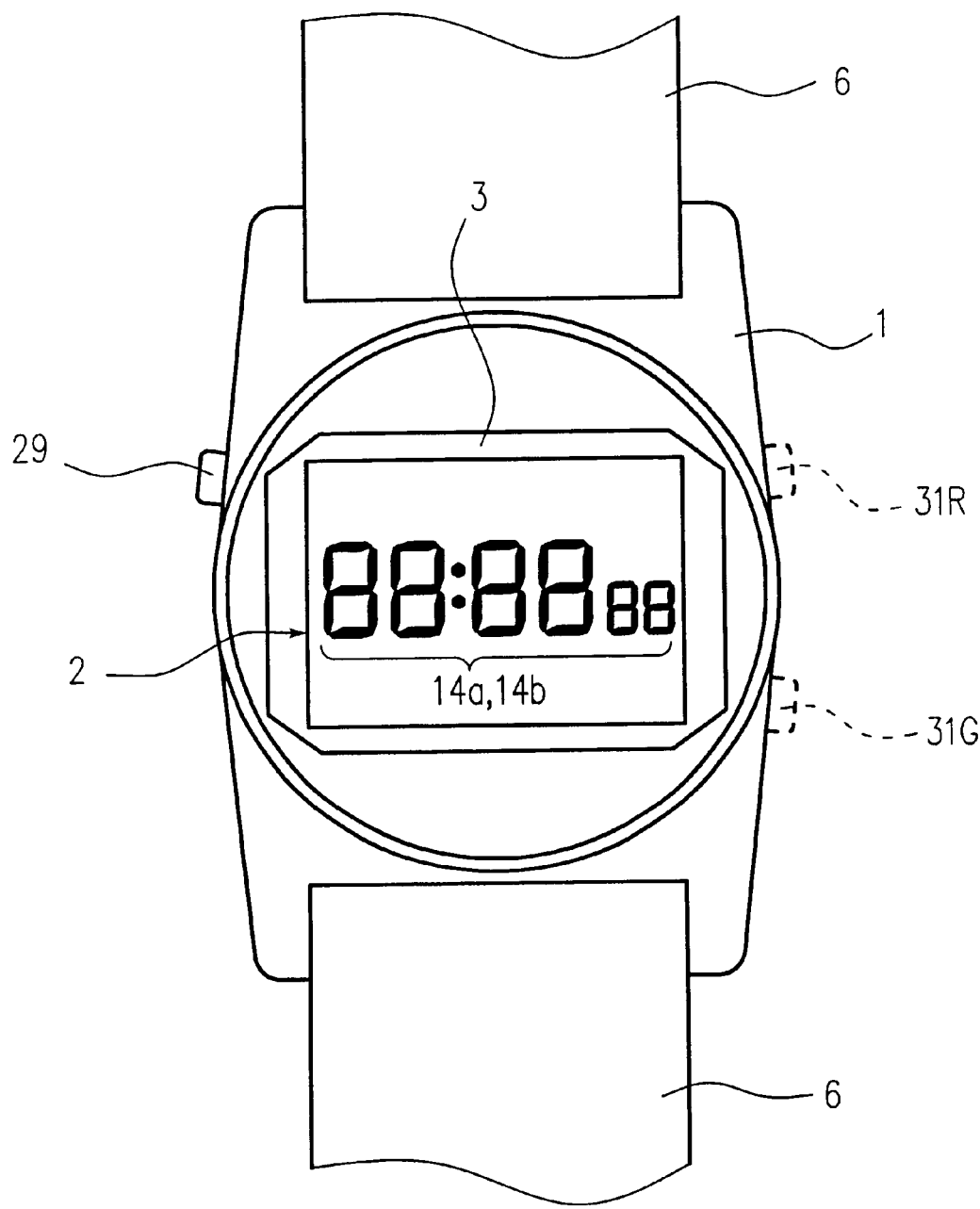
FIG. 15 is a plan view showing the external appearance of one embodiment of the electronic watch of the present invention.

FIG. 15 shows a sixth embodiment of the electronic watch of the present invention. The internal structure of the electronic watch in cross section remains unchanged from that shown in FIG. 4, and its cross-sectional view and related description are therefore omitted here.

The wristwatch of the sixth embodiment comprises a case 1, an assembly 2 housed in the inside of the case 1, a glass cover 3 arranged above the assembly 2 and secured to the case 1, and a wrist strap 6 secured to the case 1.

Figure 16:
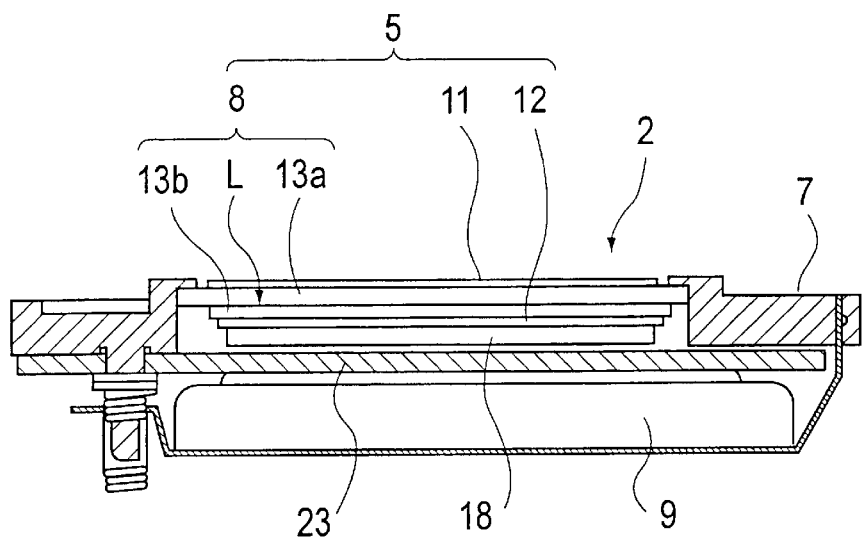
FIG. 16 is a cross-sectional view showing the internal structure of the electronic watch of FIG. 15.

Referring to FIG. 16, the assembly 2 comprises a panel frame 7, a liquid crystal element 8 as polarization changing element supported by the panel frame 7, a polarizer 11 as first polarization separator glued onto the surface, facing the viewer, (top surface in FIG. 16) of the liquid crystal element 8, a polarization separating film 12 as a second polarization separator opposed to the polarizer 11 with the liquid crystal element 8 interposed therebetween, a back light 18 as a light emitting element arranged on the underside of the polarization separating film 12, a circuit board 23 arranged on the underside of the back light 18, and a battery 9. In this embodiment, a liquid crystal cell 5 is constituted by the liquid crystal element 8, first polarizer 11 and polarization separating film 12.

Figure 14:
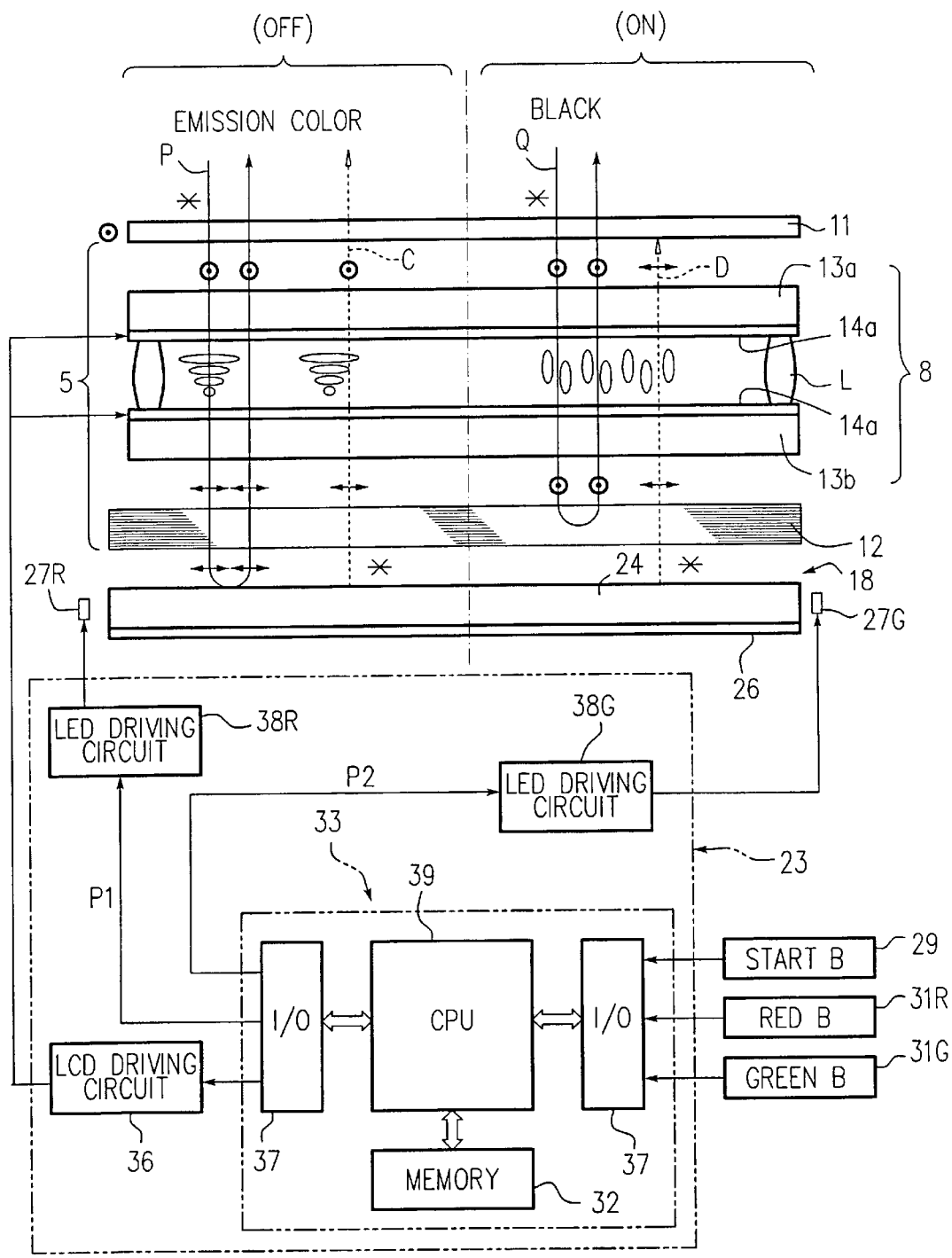
FIG. 14 diagrammatically shows a major portion of yet another embodiment of the electronic watch of the present invention.

As shown in FIG. 14, the liquid crystal element 8 comprises a pair of opposing light transmissive substrates, for example, transparent glass substrates 13a and 13b, and a liquid crystal, for example, a TN (Twisted Nematic) liquid crystal L filling the gap between the two glass substrates. Arranged on the inside surfaces of the glass substrates 13a and 13b are light transmissive electrodes 14a and 14b, respectively. In this embodiment, the light transmissive electrodes 14a and 14b are constructed of an array of six digits, each digit being a seven-segment pattern. Some of these segments are selectively colored to present numbers for time display. Although any information besides numeric information may be presented, no further discussion about this is provided here.

Referring to FIG. 14, a light emitting device 18 comprises a light guide plate 24, a light reflector plate 26 attached to the underside of the light guide plate 24, LED (Light Emitting Diode) 27R as a light source arranged on one side end face of the light guide plate 24, and LED 27G arranged on the other side end face of the light guide plate 24. LED 27R emits a red light, and LED 27G emits a green light. A plurality of LEDs 27R and a plurality of LEDs 27G are respectively arranged along both end faces of the light guide plate 24, namely perpendicular to the page of FIG. 14.

The polarizer 11 arranged on the surface, facing the viewer, of the liquid crystal element 8 transmits linearly polarized light polarized in one direction while not transmitting the remaining polarized light by absorbing or dispersing them. The polarization separating film 12 arranged on the rear surface, with respect to the viewer, of the liquid crystal element 8, is a polarization separating film having a structure in which a number of films are laminated as shown in FIG. 2. As already described, the polarization separating film 12 transmits linearly polarized light polarized in a first direction while not absorbing but reflecting the remaining polarized light, particularly, totally reflecting the linearly polarized light polarized in a direction perpendicular to the polarization direction of the linearly polarized light polarized in the first direction.

The circuit board 23 shown in FIG. 16 comprises various circuit components, as shown in FIG. 14, such as a controller 33 including a CPU (Central Processor Unit) 39, input/output interfaces 37 and a memory 32, an LED driving circuit 38R for driving LED 27R, an LED driving circuit 38G for driving LED 27G, and an LCD driving circuit 36 for selectively applying an ON voltage and an OFF voltage between the light transmissive electrodes 14a and 14b.

CPU 39 feeds a control signal P1 to the LED driving circuit 38R, and a control signal P2 to the LED driving circuit 38G. The LED driving circuit 38R feeds a current to LED 27R to cause it to emit a red light when the control signal P1 is an ON pulse. The LED driving circuit 38G feeds a current to LED 27G to cause it to emit a green light when the control signal P2 is an ON pulse. The frequency of the two control signals P1 and P2 may be 100 Hz or higher. According to an experiment, the display is free from flickering with a frequency set to 100 Hz or higher.

CPU 39 controls the lighting of LED 27R and LED 27G under the program stored in the memory 32, and in this embodiment, varies the duty factor of the current supplied to each LED to modify color gradation for time display to multi-level color gradation, for example, to 16 levels of color gradation. The duty factor here means the ratio of the duration of the ON time to one full period as shown in FIG. 17, and is expressed by the following equation.

Duty factor=(ON time/one period)×100(%)

Figure 17:
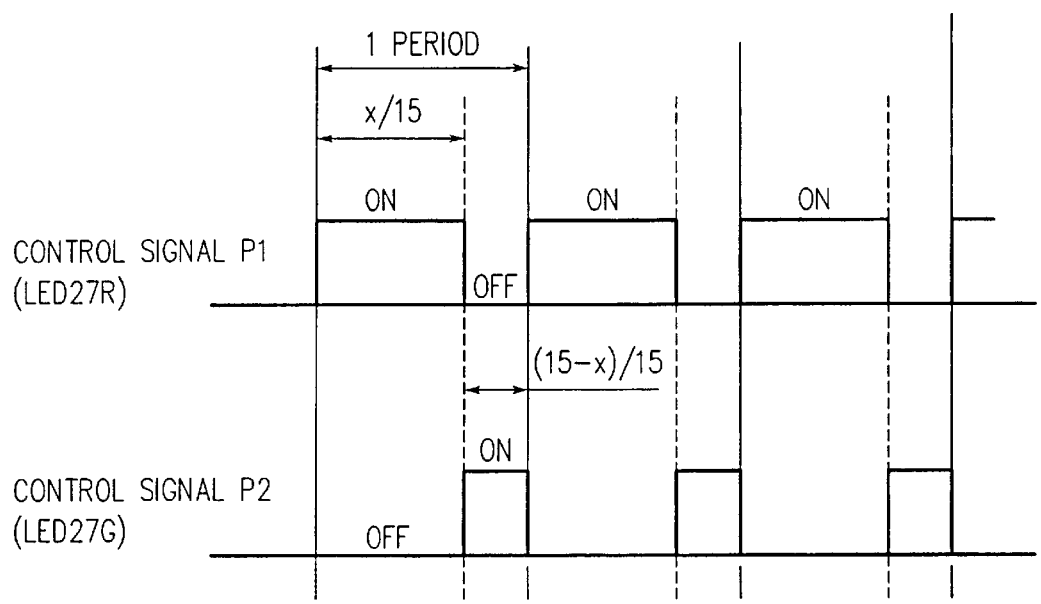
FIG. 17 is a timing diagram showing the main control signals generated in a control circuit of FIG. 14.

In this embodiment as shown in FIG. 17, LED 27R is lit in an earlier portion of one period while LED 27G is lit in a later portion of one period. To achieve 16 levels of color gradation, the duty factor for each of LED 27R and LED 27G needs to be changed in 16 levels, and in FIG. 17, the duty factor of LED 27R is defined by x/15 while the duty factor of LED 27G is defined by (15−x)/15 (x is an integer within a range of $0 \leq x \leq 15$).

The operation of the electronic watch thus constructed is now discussed. The electronic watch has two light source modes: in one mode, the emission of the back light 18 is used, and in the other mode, the natural ambient light is used without using the emission of the back light 18.

When the natural ambient light is used for display under light daylight conditions, as shown by an arrow P in an area where the OFF voltage is applied to the liquid crystal element 8 as shown FIG. 14 linearly polarized light polarized in a direction parallel to the page of FIG. 14, out of the natural ambient light are transmitted through the polarizer 11 and are twisted by 90° in polarization direction by the liquid crystal element 8 at an OFF state, thereby becoming linearly polarized light polarized in a direction perpendicular to the page of FIG. 14. The linearly polarized light is then transmitted through the polarization separating film 12, then reaches the surface of the light guide plate 24, is reflected from the surface of the light guide plate 24, and is transmitted through the polarization separating film 12, liquid crystal element 8 and polarizer 11, and are then externally presented. The viewer thus recognizes the color light reflected from the light guide plate 24 as the background color of the time display.

In an area where the ON voltage is applied to the liquid crystal element 8, as represented by an arrow Q, linearly polarized light polarized in a direction perpendicular to the page of FIG. 14, out of the external light, is picked out by the polarizer 11, and is transmitted through the liquid crystal element 8 without being twisted in polarization direction. The linearly polarized light is reflected from the respective interlayer surfaces of the polarization separating film 12 depending on wavelength, and then transmitted through the liquid crystal element 8 and polarizer 11 and then externally presented. The viewer recognizes the color light reflected from the polarization separating film 12 as the time display of numeric information and the like. Specifically, the numeric information and the like are recognized by the contrast between the color light reflected from the light guide plate 24 and the color light reflected from the polarization separating film 12.

An emission start button 29 in FIG. 15 is pressed when the viewer wants to see a bright display under dark conditions, such as nighttime, or to enjoy a special mode of display different from a standard display. CPU 39 shown in FIG. 14 operates to cause LED 27R and/or LED 27G to light for the back light 18 to emit light. In this state, in the area where the OFF voltage is applied to the liquid crystal element 8, as represented by an arrow C, linearly polarized light polarized in a direction parallel to the page of FIG. 14, out of the emission of the back light 18, namely randomly polarized light, is picked out by the polarization separating film 12, is twisted in polarization direction by 90° by the liquid crystal element 8 at an Off state, become linearly polarized light polarized in a direction perpendicular to the page of FIG. 14, and is transmitted through the polarizer 11 to be recognized from outside by the viewer. The viewer recognizes the emission color of the light emitting device 18 as the background color for the time display. In this embodiment, a new method is implemented in the emission color, but more discussion on this will be given later.

In the area where the ON voltage is applied to the liquid crystal element 8, as represented by an arrow D, linearly polarized light polarized in a direction parallel to the page of FIG. 14, out of the emission of the light emitting device 18, is picked out by the polarization separating film 12, and is transmitted through the liquid crystal element 8 at an ON state. This linearly polarized light is prevented from exiting outward as a result of being absorbed or dispersed by the polarizer 11, and is externally recognized as "black" by the viewer.

Through the above process, the viewer sees the emission color of the light emitting device 18 as the background color and the numeric information in black against the background color. Specifically, the viewer recognizes the numeric information and the like based on the contrast between the emission color of the light emitting device 18 and black. Since a special method is implemented in the emission color of the light emitting device 18 as described below, the viewer can enjoy a novel time display different from an ordinary one.

Figure 18:
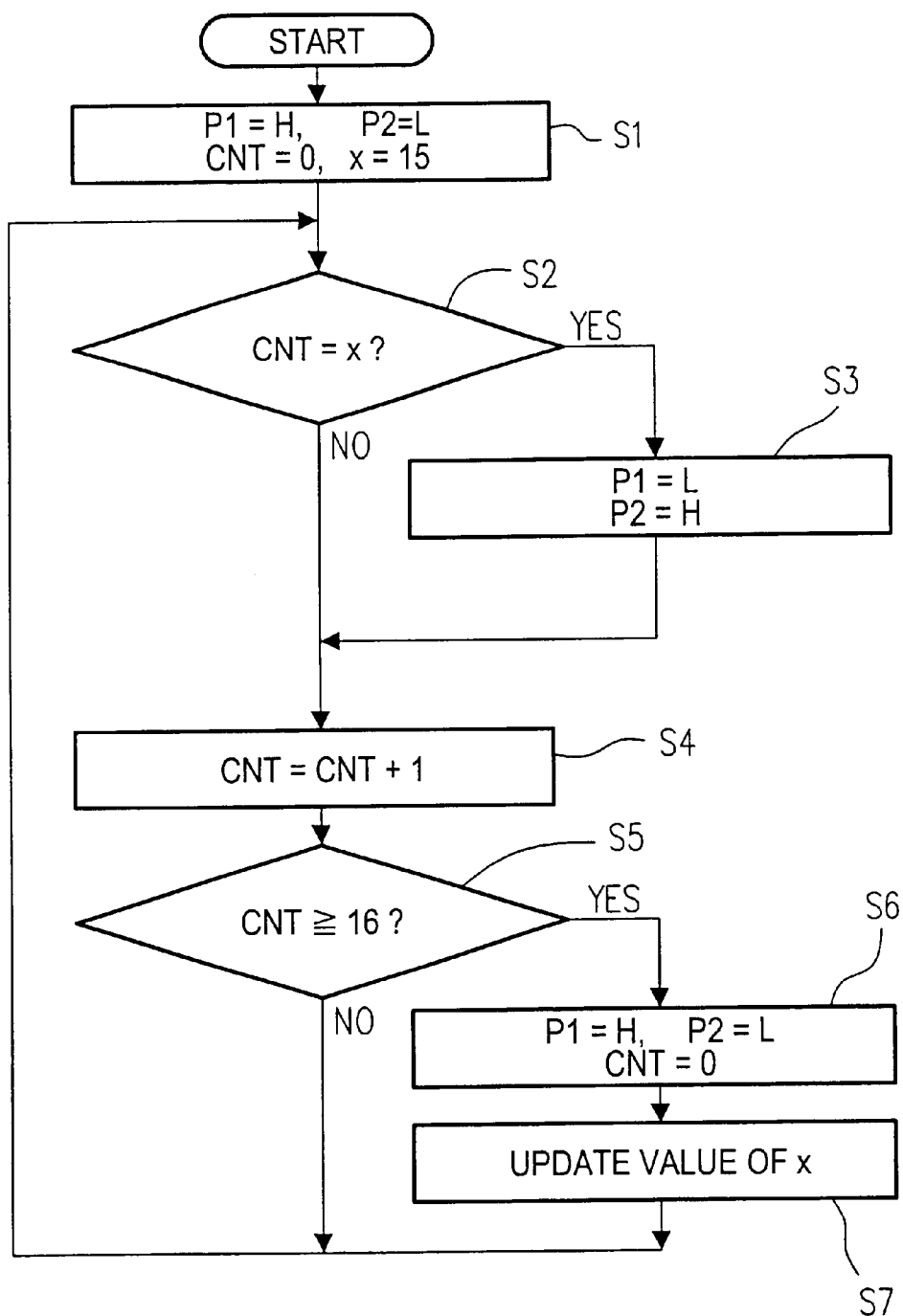
FIG. 18 is a flow diagram showing a major portion of the process executed by the control circuit in FIG. 14.

When the emission start button 29 is pressed in FIG. 15, CPU 39 in FIG. 14 executes the process illustrated by a flow diagram shown in FIG. 18 under the control of the program stored in the memory 32. More specifically, in step S1, CPU 39 drives the control signal P1 to "H", the control signal P2 to "L", a counter CNT to an initial value=0, and the value x determining the duty factor to an initial value=15.

The process is repeated in the step order of step S2→step S4→step S5→step S2. In the repeated processes, the count value is incremented by 1 in step S4 until it is "15", and when it is "15", it is determined in step S2 that the answer is YES, and the process goes to step S3, where the control signal P1 is driven to "L" and the control signal P2 to "H". In step S4, the count value is incremented to "16" and it is determined in step S5 that the answer is YES, and the process goes to step S6, where the control signal P1 is driven to "H", the control signal P2 is driven to "L" and the count value is cleared to "0".

As a result of the above processes, LED 27R is driven at a duty factor of 15/15 while LED 27G is driven at a duty factor of 0/15, and thereby 100% of the emission is red at a first level of gradation in [Table 1] incorporated while the counting is repeated for a time duration of from 0 second ~0.25 second. In step S7, the duty factor is changed from x=15 to x=14.

In the same manner as described above, the process is repeated in the step order of step S2→step S4→step S5→step S2 until the counter CNT is CNT=x(14) in step S2. When the counter CNT is CNT=x(14), the control signal P1 is driven to "L" while the control signal P2 is driven to "H" in step S3, and this state continues until the count value is incremented to "16"in step S4.

As a result of the above processes, LED 27R is driven at a duty factor of 14/15 while LED 27G is driven at a duty factor of 1/15, and thereby 94% of the emission is red while 6% is green at a second level of gradation in [Table 1] while the counting is repeated for a time duration from 0.25 second~to 0.5 second.

The same process is repeated thereafter, and for a time duration from 1.75 seconds~to 2.0 seconds, a color mixture is provided with 50% red and 50% green at an eighth level of gradation, namely an orange light is emitted, and further for a time duration from 3.75 seconds~4 seconds, 100% of the emission is green at a sixteenth level of gradation.

The change in color mixture state, namely level change in color gradation, from 100% red to 100% green, is performed for four seconds, and as long as an viewer's instruction to stop is not entered, the level change in color gradation is repeated every four-second cycle. The viewer sees the sequential change in the background color that cycles through red→orange→green every four-second cycle, and thus enjoys a very pleasant time display.

In the above discussion, the emission of the light emitting device 18 is used for display with the OFF voltage applied to present the background color, as shown in FIG. 14, and the emission color is used as the background color. Alternatively, the polarization direction of the first polarizer 11 is changed by 90° in FIG. 14, the emission color is used for display when the ON voltage is used to present numeric information and the like.

In this embodiment, the polarization separating film 12 having a structure into which many films are laminated as shown in FIG. 2 is used as the second polarization separator arranged on the underside of the liquid crystal element 8, namely on the side of the liquid crystal element 8 opposite to the viewer. Alternatively, the second polarization separator may be an ordinary polarizer having the same optical characteristics as those of the polarizer 11, instead of the polarization separating film 12.

When an ordinary polarizer is used as the second polarization separator, the light from the light emitting device 18 passes through the polarizer, light polarized in directions other than a predetermined direction are absorbed, and the light drop in light intensity, darkening the time display and presenting difficult in viewing.

In the embodiment shown in FIG. 14 where the polarization separating film 12 is used as the second polarization separator, the emission of the light emitting device 18 presents the time display as represented by the arrow C, and although the polarized light, other than the linearly polarized light beam transmitted through polarization separating film 12, is not directly transmitted through the polarization separating film 12, they gradually change their polarization direction in the course of repeated reflection between the polarization separating film 12 and the light guide plate 24 of the light emitting device 18, and are finally transmitted through the polarization separating film 12 and contribute to the time display. As a result, the time display is substantially brighter than the case where an ordinary polarizer is used.

TABLE 1

(Relationship between elapsed time and color)

| Gradation | 1 | 2 | ... | 8 | ... | 15 | 16 |
|---|---|---|---|---|---|---|---|
| Time | 0~0.25 | 0.25~0.5 | ... | 1.75~2.0 | ... | 3.5~3.75 | 3.75~4.0 |
| Con. Sig. P1 duty factor (LED 27R) | 15/15 | 14/15 | ... | 8/15 | ... | 1/15 | 0/15 |
| Con. Sig. P2 duty factor (LED 27G) | 0/15 | 1/15 | ... | 8/15 | ... | 14/15 | 15/15 |
| Color | 100% red | 94% red 6% green | ... | orange | ... | 94% green 6% red | 100% green |

Since the duty factor is automatically updated in step S7 in FIG. 18 in the sixth embodiment, the background color of the time display is repeatedly cycled through red→orange→green at regular intervals. Alternatively in the seventh embodiment, the background color of the time display is manually changed by the viewer.

More specifically, a button for a red color 31R and a button for a green color 31G are provided in suitable locations of the side face of the case 1 constituting the electronic watch as shown in FIG. 15, and the outputs of the buttons are connected to CPU 39 via the input/output interfaces 37 as shown in FIG. 14.

In this embodiment, the memory 32 (shown in FIG. 14) has a predetermined memory location for storing the value x determining the duty factor, and the value x determining the duty factor is updated for a value desired by the viewer in response to the number of pressings of the red button 31R or the green button 31G. The time display is thus presented in any color in the range red→orange→green as the viewer desires. For example, when the red button 31R is pressed repeatedly many times, the value x increases shifting the display color to a reddish color, and when the green button 31G is pressed repeatedly many times, the value x decreases shifting the display color to a greenish color. The display color may be changed depending on the pressing duration of the red button 31R or the green button 31G.

In the embodiment shown in FIG. 14, the color mixture state of red and green in the light emitting device 18 as the light emitting means is changed by changing the ratio of emission color strengths of LED 27R and LED 27G. Alternatively in this embodiment, a plurality of light sources of different emission colors are arranged, and the color mixture state is thus changed by varying the emission area of each light source.

Figure 20:
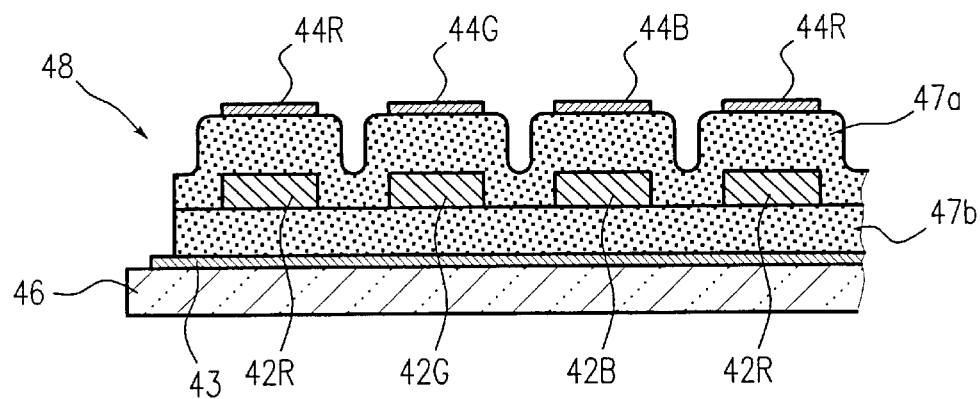
FIG. 20 is a cross-sectional view showing the section of the light emitting device of FIG. 19.

FIG. 20 shows a light emitting device suitable for such a light emission method. The light emitting device 48 comprises, on a glass substrate 46, EL emission layers for emitting different color lights such as a red EL (Electroluminenscence) emission layer 42R, a green EL emission layer 42G, and a blue EL emission layer 42B, and these emission layers are interposed between a common flat electrode 43 and individual electrodes 44R, 44G and 44B, respectively. Reference characters 47a and 47b designate respectively an insulating layer.

Figure 19:
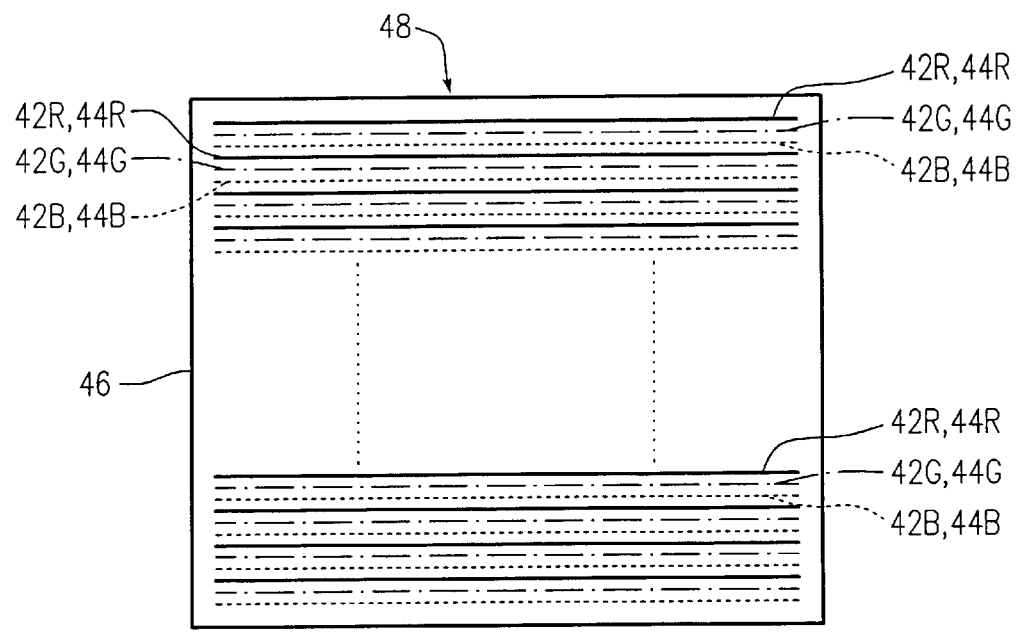
FIG. 19 is a plan view showing a modification of a light emitting device.

The EL emission layers 42R, 42G and 42B and their corresponding individual electrodes 44R, 44G and 44B are arranged periodically and in parallel, and thus in a comb-like fashion on the glass substrate 46 as shown in FIG. 19. The electrodes 44R, 44G and 44B are connected such that they are supplied with a voltage in a group. To select the electrodes to be supplied with the voltage, the emission area of each of the red EL emission layer 42R, the green EL emission layer 42G, and the blue EL emission layer 42B is individually adjusted, and the color mixture state of the emission of the light emission device 48 is adjusted as desired to result in a desired emission color.

By substituting the light emitting device 48 for the light emitting device 18 shown in FIG. 14, the background color and the numeric information and the like in the time display are presented in a variety of colors. The EL emission layers are not limited to red, green and blue, and in addition to or instead of these colors, yellow, black and other colors may be used. Even with the same colors, the emission layers may be arranged for varying emission strength.

Although the preferred embodiments have been discussed in connection with the electronic watch, the present invention is not limited to these embodiments, and other embodiments are possible.

In each of the above embodiments, the red light source and the green light source are selected as the light sources of different color, but any other color may be selected, and two or more colors may be selected to be mixed together.

Since the color mixture state of the different emission colors is varied automatically or manually by the viewer in each of the above embodiments, the viewer can enjoy the time display that varies periodically or as desired. The electronic watch of this invention not only presents the color mixture state that varies periodically or as desired, but also may have the color mixture state fixed. In this case, as well, depending on the mixing method of a plurality of emission colors, the electronic watch presents a display color appealing to the viewer, and even given the same type of electronic watches, a diversity of different display colors are presented by changing the initial setting in connection with emission conditions.

In the above embodiments, LEDs or EL elements are used as the light sources, and alternatively, a white-light lamp may be used.

In the electronic watch, the numeric information and the like are presented in the emission color of the light emitting element when the emission of the light emitting element is used to present them, and the mode of display for the numeric information and the like is diversified compared with the conventional watch which presents the numeric information in black only. Since the light reflected from the second polarization separator is used to present the white background, the drop in luminance arising from light absorption through the polarizer is reduced and a distinct white background results, compared with the conventional art in which the white background is presented by the light ray transmitted through the polarizer.

Also, the electronic watch may have a plurality of color lights emitted from the light emitting element permitting the background of the information display screen of the electronic watch to be changed in color or the numeric information and the like presented on the information display screen to be changed in color, and as a result, the mode of display is novel and appealing to the viewer.

Further, the electronic watch may use selective light of the color light sources to permit the information display area such as the background and numeric information on the time display to be presented not only in white or black, but also in a desired color from among a variety of colors, and as a result, the time display is novel and appealing to the viewer. In operative cooperation with a diversity of sensors, like the ones for temperature and pressure, or a timer, the electronic watch may work as a warning indicator for diving conditions on a diver's watch, for example.

What is claimed is:

1. A display device in an electronic watch, comprising:
   a first polarization separator that transmits linearly polarized light polarized in a first direction and that does not transmit linearly polarized light polarized in a second direction perpendicular to said first direction;
   a polarization changing element disposed at a position to receive the linearly polarized light transmitted from said first polarizing separator, that selects between a state in which a polarization of the linearly polarized light is changed and a state in which the polarization is not changed;
   a second polarization separator, diametrically opposed to said first polarization separator with said polarization changing element interposed therebetween, that transmits linearly polarized light polarized in the second direction and reflects linearly polarized light polarized in a direction perpendicular to said second direction; and
   a light emitting element that emits light to said polarization changing element through said second polarization separator, wherein the electronic watch provides emissions of different colors in a color mixture to a naked-eye human vision state that changes automatically at predetermined time intervals.

2. The display device in an electronic watch according to claim 1, further comprising a light scattering layer arranged between said first polarization separator and said light emitting element.

3. The display device in an electronic watch according to claim 1, wherein said light emitting element emits at least one of orange, red, and yellowish green light.

4. The display device in an electronic watch according to claim 1, wherein said light emitting element emits multi-color light.

5. The display device in an electronic watch according to claim 1, wherein said light emitting element comprises a color filter.

6. The display device in an electronic watch according to claim 1, wherein said second polarization separator has a multi-layered structure in which two types of layers are alternately laminated, and two adjacent ones of the layers have a same refractive index in one direction, and have a different refractive index in a direction perpendicular to said one direction, and the plurality of layers have a varying thickness from layer to layer.

7. The display device in an electronic watch according to claim 1, further comprising a semi-transmissive layer arranged between said second polarization separator and said light emitting element.

8. A display device in an electronic watch, comprising:
   a first polarization separator that transmits linearly polarized light polarized in a first direction and does not transmit linearly polarized light polarized in a second direction perpendicular to said first direction;
   a polarization changing element disposed at a position to receive the linearly polarized light transmitted from said first polarizing separator, that selects between a state in which a polarization of the linearly polarized light is changed and a state in which the polarization is not changed;
   a second polarization separator, diametrically opposed to said first polarization separator with said polarization changing element interposed therebetween, that transmits linearly polarized light polarized in the second direction and reflects linearly polarized light polarized in a direction perpendicular to said second direction; and
   a light emitting element that emits light to said polarization changing element through said second polarization separator, said light emitting element emitting light of a plurality of colors to said polarization changing element, wherein the electronic watch provides emissions of different colors in a color mixture to a naked-eye human vision state that changes automatically at predetermined time intervals.

9. The display device in an electronic watch according to claim 8, wherein said light emitting element has a plurality of light sources that emit light of different colors.

10. The display device in an electronic watch according to claim 8, wherein said light emitting element has color filters of a plurality of types that selectively transmit light of different colors.

11. The display device in an electronic watch according to claim 8, wherein said second polarization separator transmits linearly polarized light polarized in the second direction and reflects linearly polarized light polarized in a direction perpendicular to said second direction.

12. The display device in an electronic watch according to claim 11, wherein said light emitting element emits light of a plurality of colors including at least one of orange, red and yellowish green.

13. The display device in an electronic watch according to claim 8, further comprising a semi-transmissive layer arranged between said second polarization separator and said light emitting element.

14. A display device in an electronic watch, comprising:
   a liquid crystal cell that changes a light transmission state of light by changing an applied electric filed, said liquid crystal cell comprising:
   1) a first polarization separator that transmits linearly polarized light polarized in a first direction and does not transmit linearly polarized light polarized in a second direction perpendicular to said first direction;

2) a polarization changing element disposed at a position to receive the linearly polarized light transmitted from said first polarizing separator, that selects between a state in which a polarization of the linearly polarized light is changed and a state in which the polarization is not changed; and 3) a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said liquid crystal cell on the basis of at least one light source for one color, said light emitting element comprising light sources of different light colors, wherein the electronic watch provides emissions of different colors in a color mixture to a naked-eye human vision state that changes automatically at predetermined time intervals.

15. The display device in an electronic watch according to claim 14, wherein the at least one light source are one of an electroluminescence, a light emitting diode and a lamp, or a combination thereof.

16. The display device in an electronic watch according to claim 14, further comprising a semi-transmissive layer arranged between said second polarization separator and said light emitting element.

17. A display device in an electronic watch, comprising:
a liquid crystal cell that changes a light transmission state of light by changing an applied electric filed, said liquid crystal cell comprising:

1) a first polarization separator that transmits linearly polarized light polarized in a first direction and does not transmit linearly polarized light polarized in a second direction perpendicular to said first direction;

2) a polarization changing element disposed at a position to receive the linearly polarized light transmitted from said first polarizing separator, that selects between a state in which a polarization of the linearly polarized light is changed and a state in which the polarization is not changed; and 3) a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said liquid crystal cell on the basis of at least one light source for one color, said light emitting element comprising light sources of different light colors, wherein the electronic watch provides emissions of different colors in a color mixture to a naked-eye human vision state that changes by changing the emission strength of each at least one light source in said light emitting element.

18. A display device in an electronic watch, comprising:
a liquid crystal cell that changes a light transmission state of light by changing an applied electric filed, said liquid crystal cell comprising:

1) a first polarization separator that transmits linearly polarized light polarized in a first direction and does not transmit linearly polarized light polarized in a second direction perpendicular to said first direction;

2) a polarization changing element disposed at a position to receive the linearly polarized light transmitted from said first polarizing separator, that selects between a state in which a polarization of the linearly polarized light is changed and a state in which the polarization is not changed; and 3) a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said liquid crystal cell on the basis of at least one light source for one color, said light emitting element comprising light sources of different light colors, wherein the electronic watch provides emissions of different colors in a color mixture to a naked-eye human vision state that changes by changing the emission area of each at least one light source in said light emitting element.

19. A display device in an electronic watch, comprising:
a first polarization separator that transmits linearly polarized light polarized in a first direction and that does not transmit linearly polarized light polarized in a second direction perpendicular to said first direction;

a polarization changing element disposed at a position to receive the linearly polarized light transmitted from said first polarizing separator, that selects between a state in which a polarization of the linearly polarized light is changed and a state in which the polarization is not changed;

a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said polarization changing element through said second polarization separator, wherein the electronic watch provides emissions of different colors in a color mixture to a naked-eye human vision state that changes by changing the emission strength of each at least one light source in said light emitting element.

20. A display device in an electronic watch, comprising:
a first polarization separator that transmits linearly polarized light polarized in a first direction and does not transmit linearly polarized light polarized in a second direction perpendicular to said first direction;

a polarization changing element disposed at a position to receive the linearly polarized light transmitted from said first polarizing separator, that selects between a state in which a polarization of the linearly polarized light is changed and a state in which the polarization is not changed;

a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said polarization changing element through said second polarization separator, said light emitting element emitting light of a plurality of colors to said polarization changing element, wherein the electronic watch provides emissions of different colors in a color mixture to a naked-eye human vision state that changes by changing the emission strength of each at least one light source in said light emitting element.

21. A display device in an electronic watch, comprising:

a first polarization separator that transmits linearly polarized light polarized in a first direction and that does not transmit linearly polarized light polarized in a second direction perpendicular to said first direction;

a polarization changing element disposed at a position to receive the linearly polarized light transmitted from said first polarizing separator, that selects between a state in which a polarization of the linearly polarized light is changed and a state in which the polarization is not changed;

a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said polarization changing element through said second polarization separator, wherein the electronic watch provides emissions of different colors in a color mixture to a naked-eye human vision state that changes by changing the emission area of each at least one light source in said light emitting element.

22. A display device in an electronic watch, comprising:

a first polarization separator that transmits linearly polarized light polarized in a first direction and does not transmit linearly polarized light polarized in a second direction perpendicular to said first direction;

a polarization changing element disposed at a position to receive the linearly polarized light transmitted from said first polarizing separator, that selects between a state in which a polarization of the linearly polarized light is changed and a state in which the polarization is not changed;

a second polarization separator, diametrically opposed to said first polarization separator with said polarization changing element interposed therebetween, that transmits linearly polarized light polarized in the second direction and reflects linearly polarized light polarized in a direction perpendicular to said second direction; and a light emitting element that emits light to said polarization changing element through said second polarization separator, said light emitting element emitting light of a plurality of colors to said polarization changing element, wherein the electronic watch provides emissions of different colors in a color mixture to a naked-eye human vision state that changes by changing the emission area of each at least one light source in said light emitting element.

* * * * *